US012034362B2

(12) United States Patent
Despesse et al.

(10) Patent No.: US 12,034,362 B2
(45) Date of Patent: Jul. 9, 2024

(54) ELECTRONIC DEVICE AND METHOD FOR CONTROLLING AN ELECTRIC ENERGY CONVERTER COMPRISING A PIEZOELECTRIC ELEMENT, RELATED ELECTRONIC SYSTEM FOR ELECTRIC ENERGY CONVERSION

(71) Applicant: Commissariat à l'énergie atomique et aux énergies alternatives, Paris (FR)

(72) Inventors: Ghislain Despesse, Grenoble (FR); Mustapha Touhami, Grenoble (FR); Adrien Morel, Grenoble (FR); Gaël Pillonnet, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 243 days.

(21) Appl. No.: 17/659,232

(22) Filed: Apr. 14, 2022

(65) Prior Publication Data

US 2022/0345037 A1    Oct. 27, 2022

(30) Foreign Application Priority Data

Apr. 21, 2021  (FR) ...................... 21 04154

(51) Int. Cl.
*H02M 3/158* (2006.01)
*H02M 1/00* (2006.01)
(Continued)

(52) U.S. Cl.
CPC .......... *H02M 1/0058* (2021.05); *H02M 3/01* (2021.05); *H02M 3/155* (2013.01); *H02M 3/158* (2013.01)

(58) Field of Classification Search
CPC ....... H02M 3/01; H02M 3/158; H02M 1/0058
See application file for complete search history.

(56) References Cited

U.S. PATENT DOCUMENTS 6,396,250 B1   5/2002   Bridge
7,724,547 B1   5/2010   Zheng et al.
(Continued)

FOREIGN PATENT DOCUMENTS

EP   3 382 875 A1   10/2018
EP   3 451 519 A1   3/2019
FR   3 086 471 A1   3/2020

OTHER PUBLICATIONS

French Preliminary Search Report Issued Nov. 26, 2021 in French Application 21 04154 filed on Apr. 21, 2021(with English Translation of Categories of Cited Documents), 4 pages.
(Continued)

*Primary Examiner* — Alex Torres-Rivera
(74) *Attorney, Agent, or Firm* — Oblon, McClelland, Maier & Neustadt, L.L.P.

(57) ABSTRACT

An electronic control device for controlling a converter that comprises a piezoelectric element and a plurality of switches which are commanded to alternate phases, respectively at substantially constant voltage, and substantially constant charge, across the terminals of said piezoelectric element, the control device comprising:
- a measurement module for measuring a period of a resonance cycle of the piezoelectric element;
- an event detection module for detecting a characteristic event belonging to a current resonance cycle;
- a command module for commanding the switching of the switches;
- a computation module for computing at least three subsequent switching time instants during at least one subsequent resonance cycle, which is posterior to the current resonance cycle, each subsequent switching time instant being computed based on a respective characteristic event; and (Continued)

the command module being configured to command the switching of the respective switch at each of the subsequent time instants computed.

25 Claims, 15 Drawing Sheets

(51) Int. Cl.
*H02M 3/00* (2006.01)
*H02M 3/155* (2006.01)

(56) References Cited

U.S. PATENT DOCUMENTS

| | | |
|---|---|---|
| 10,128,766 B1 | 11/2018 | Strijker et al. |
| 2010/0188873 A1 | 7/2010 | Zheng et al. |
| 2013/0169198 A1* | 7/2013 | Wei .................. H02P 31/00 |
| | | 318/116 |
| 2014/0334193 A1* | 11/2014 | Meyer ................ H02M 7/537 |
| | | 363/21.01 |
| 2018/0287503 A1 | 10/2018 | Despesse et al. |
| 2018/0367042 A1* | 12/2018 | Andersen ............. H02M 1/36 |
| 2019/0020269 A1* | 1/2019 | Ekhtiari ........... H02M 3/33592 |
| 2020/0098968 A1* | 3/2020 | Despesse ........... H10N 30/804 |
| 2020/0099297 A1* | 3/2020 | Despesse ......... H02M 3/33584 |

OTHER PUBLICATIONS

Pollet et al., "Convertisseurs DC-DC Piezoelectrique Avec Stockage Provisoire D'energie Sous Forme Mecanique", Autre, Universite Paris Saclay (COmUE), 2019, 175 Pages (with English translation).

\* cited by examiner

ELECTRONIC DEVICE AND METHOD FOR CONTROLLING AN ELECTRIC ENERGY CONVERTER COMPRISING A PIEZOELECTRIC ELEMENT, RELATED ELECTRONIC SYSTEM FOR ELECTRIC ENERGY CONVERSION

CROSS-REFERENCE TO RELATED APPLICATIONS

This application is a U.S. non-provisional application claiming the benefit of French Application No. 21 04154, filed on Apr. 21, 2021, which is incorporated herein by reference in its entirety.

FIELD

The present invention relates to an electronic control device for controlling an electrical energy converter, the electrical energy converter comprising a piezoelectric element and a plurality of switches adapted to being commanded to alternate phases at substantially constant voltage across the terminals of the piezoelectric element, and phases at substantially constant charge across the terminals of said piezoelectric element.

The invention also relates to an electronic energy conversion system for converting electrical energy that comprises such an electrical energy converter and such an electronic control device, as well as a control method for controlling such an electrical energy converter.

The invention relates to the field of electronic energy conversion systems for converting electrical energy, in particular those comprising a piezoelectric element, in particular conversion systems for converting into direct electrical energy, that is to say direct-direct conversion systems, also known as DC-DC (for Direct Current-Direct Current) conversion systems, and alternating-direct conversion systems, also known as AC-DC (for Alternating Current-Direct Current) conversion systems.

BACKGROUND

From the patent documents FR 3 064 850 B1, FR 3 086 471 A1 and FR 3 086 472 A1, as well as the thesis manuscript "*Convertisseurs DC-DC piézoélectrique avec stockage provisoire d'énergie sous forme mécanique [Piezoelectric DC-DC converters with temporary storage of energy in mechanical form]*" by Benjamin POLLET, an electrical energy converter and an electronic control device of the aforementioned type are already known.

In the aforementioned thesis manuscript, the electrical energy converter is typically a DC-DC converter comprising a piezoelectric element, with a first switch connecting a first electrode of the piezoelectric element to a first application terminal for applying a first voltage, a second switch connecting said first electrode of the piezoelectric element to a first supply terminal for supplying a second voltage, and at least a third switch connecting the first electrode to a second electrode of the piezoelectric element, said switches being commanded in a cyclical manner, at approximately constant frequency with, between each closing of one of the switches, a phase in which the piezoelectric is placed in an open electrical circuit. The closing of each switch takes place under an approximately zero voltage across its terminals. The second electrode of the piezoelectric element is connected to a second application terminal for applying the first voltage and to a second supply terminal for supplying the second voltage.

In steady state, a command cycle comprises the following successive phases: (I) opening of the electrical circuit in which the piezoelectric is placed; (II) closing of the first switch; (III) opening of the electrical circuit in which the piezoelectric is placed; (IV) closing of the third switch; (V) opening of the electrical circuit in which the piezoelectric is placed; and (VI) closing of the second switch.

Each opening of the electrical circuit in which the piezoelectric is placed or closing of a respective switch is then controlled via the detection of a triggering event associated with the concerned switching, then via the sending of the opening or closing command signal to the corresponding switch or switches upon detection of said event. The associated triggering event is for example a zero crossing of the current flowing through the piezoelectric element; or even the passing of the voltage across the terminals of the piezoelectric element (or of the voltage between a terminal and a reference potential, for example the ground of the assembly) to a respective substantially constant voltage value.

However, such control of this electrical energy converter is not optimal, in particular for operation of the converter at high frequency, such as at a frequency greater than 1 MHz.

SUMMARY

The object of the invention is therefore to provide an electronic control device, and an associated control method, for controlling such an electrical energy converter, that offers enhanced control of the converter, in particular at high frequency, typically above 1 MHz.

To this end, the object of the invention relates to an electronic control device for controlling an electrical energy converter, the converter comprising a piezoelectric element and a plurality of switches adapted to being commanded to alternate phases at substantially constant voltage across the terminals of the piezoelectric element, and phases at substantially constant charge across the terminals of said piezoelectric element, the electronic control device comprising:
- a measurement module configured to measure a period of a resonance cycle of the piezoelectric element;
- an event detection module configured to detect at least one characteristic event associated with the electrical energy converter, the at least one characteristic event belonging to a current resonance cycle;
- a command module configured to command the switching of each of the switches; and
- a computation module configured to compute at least three subsequent switching time instants during at least one subsequent resonance cycle, each subsequent resonance cycle being posterior to the current resonance cycle, each subsequent switching time instant being computed based on a respective characteristic event, a first subsequent time instant corresponding to the opening of a first switch, a second subsequent time instant corresponding to the closing of a second switch, and a third subsequent time instant corresponding to the opening of the second switch; and
- the command module being configured to command the switching of the respective switch at each of the subsequent time instants computed.

With the electronic control device according to the invention, the subsequent switching time instants for switching of the switches are then computed in advance for one or more subsequent resonance cycles, that are posterior to the current resonance cycle. This thus then makes it possible to ensure the proper operation of the converter with switching of the switches at the appropriate time instants even for operating the converter at a high operating frequency, such as a frequency greater than 1 MHz, where the operating frequency of the converter is equal to the inverse of the period of the resonance cycle, also known as the resonance period, that is to say, equal to the inverse of the duration of said cycle.

With the control device of the state of the art, switching offsets are likely to appear progressively for high frequency operation. Indeed, a voltage or current comparison takes several nanoseconds, denoted as ns; the generation of a command signal being sent to the one or more corresponding switch(es), such as power transistors, also requires a few ns to several tens of ns; and the time of opening or closing of said switch itself, such as the transistor, also requires a few ns. Thus, considering these different time periods cumulatively, the control according to the state of the art of the electrical energy converter lasts per se from one to several tens of ns at each phase of the command cycle. However, for an operating frequency equal to 10 MHz, the resonance period lasts 100 ns, and each phase of the command cycle lasts less than 50 ns. A delay in control of one to several tens of ns at each phase of the command cycle thus then generates time shifts that are detrimental with regard to the resonance period.

According to other advantageous aspects of the invention, the electronic control device comprises one or more of the following characteristic features, taken into consideration separately or according to all technically possible combinations:

the total number of phases at substantially constant voltage across the terminals of the piezoelectric element, and at substantially constant charge across the terminals of said piezoelectric element during a respective resonance cycle is greater than or equal to 6;

each characteristic event is selected from the group consisting of: a zero crossing of the current flowing through the piezoelectric element; the passing of the voltage across the terminals of the piezoelectric element to a predefined value; the passing of the voltage between a terminal of the piezoelectric element and a reference potential to a predefined value; the passing of the voltage across the terminals of the piezoelectric element to a respective substantially constant voltage value; the passing of the voltage between the terminal of the piezoelectric element and the reference potential to a respective substantially constant voltage value; and the passing to a reference deformation value, such as a deformation value measured via a separate electrode disposed against the piezoelectric element;

the characteristic event associated with the first, second, and third subsequent time instants is the zero crossing of the current flowing through the piezoelectric element;

the characteristic event preferably being the zero crossing and by decreasing values of said current;

each subsequent time instant computed depends on a time difference equal to K times the period of the resonance cycle of the piezoelectric element, K being an integer with a value greater than or equal to 1;

the value of the number K is determined as a function of the duration of the period of the resonance cycle, and the shorter the duration of said period, the higher the value of the number K;

the value of the number K preferably being greater than 2;

each of the first, second, and third subsequent time instants is equal, based on the characteristic event, to the sum of the time difference and a respective reference time period;

each respective reference time period being preferably determined based on the corresponding switching time instant during the current resonance cycle, or based on the period of the resonance cycle;

the command module is, in order to command the switching of a respective switch, configured to send a command signal to said switch at a respective transmission time instant, each transmission time instant being equal to the respective subsequent switching time instant minus a switching time period specific to said switch, the switching time period being a time period necessary for the switch to perform said switching from the moment it has received the corresponding command signal;

the switching time period preferably including a propagation time period for propagating the corresponding command signal through a communication bus, and/or a galvanic isolation interface, and/or a transistor driver, and/or logic gates, and/or protection devices;

an opening-switching time period and a closing-switching time period being preferably predefined for each switch;

the computation module is configured to compute the subsequent time instants during a plurality of successive subsequent resonance cycles, the at least three subsequent time instants being computed for each of said successive subsequent cycles;

the computation module is configured to further compute a fourth subsequent time instant corresponding to the closing of the first switch;

the characteristic event associated with the fourth subsequent time instant is the passing of the voltage across the terminals of the piezoelectric element to a respective substantially constant voltage value, or else the zero crossing of the current flowing through the piezoelectric element;

the converter comprises three switches adapted to being commanded to alternate phases at substantially constant voltage across the terminals of the piezoelectric element, and phases at substantially constant charge across the terminals of said piezoelectric element; and the computation module is configured to further compute a fifth subsequent time instant corresponding to the closing of a third switch;

the characteristic event associated with the fifth subsequent time instant is the passing of the voltage across the terminals of the piezoelectric element to a respective substantially constant voltage value, or else the zero crossing of the current flowing through the piezoelectric element;

the computation module is configured to further compute a sixth subsequent time instant corresponding to the opening of the third switch;

the characteristic event associated with the sixth subsequent time instant is the zero crossing of the current flowing through the piezoelectric element, or else the passing of the voltage across the terminals of the piezoelectric element to a predefined value;

the measurement module is configured to measure the period of the resonance cycle by detecting two successive characteristic events of the same type, the period of the resonance cycle corresponds to the time period elapsed between the two successive characteristic events;

said type of characteristic event preferably being a zero crossing following a predefined monotonicity of a current flowing through the piezoelectric element;

the characteristic event is detected by comparison, with a corresponding predefined value and via a respective comparator, of a quantity selected from among the deformation of the piezoelectric element (typically via a separate electrode on the piezoelectric element), the current flowing through the piezoelectric element, the voltage across the terminals of the piezoelectric element, and the voltage between a terminal of the piezoelectric element and a reference potential, such as a potential of an electrical ground of the electrical energy converter; and the corresponding subsequent time instant further depends on a comparison time period specific to said comparator, the comparison time period being a time period necessary for the comparator to perform said comparison and generate an event detection signal for detecting the characteristic event;

the comparison time period preferably being subtracted from the time difference;

each comparison time period is predefined;

each comparison time period may further be modified via a regulation loop as a function of the difference between the observed quantity, such as the voltage across the terminals of the piezoelectric element, and the corresponding predefined value upon the detection of one or more event(s) during a previous resonance cycle;

the electrical energy converter is a step-down/buck DC-DC converter, the first switch connects a first electrode of the piezoelectric element to a first supply terminal for supplying an output voltage of the converter, and the second switch connects the first electrode of the piezoelectric element to a first application terminal for applying an input voltage of the converter;

the electrical energy converter is a step-down/buck DC-DC converter, and the third switch connects the first electrode of the piezoelectric element to a second electrode of the piezoelectric element;

the electrical energy converter is a step-up/boost DC-DC converter, the first switch connects a first electrode of the piezoelectric element to a first application terminal for applying an input voltage of the converter, and the second switch connects the first electrode of the piezoelectric element to a second electrode of the piezoelectric element;

the electrical energy converter is a step-up/boost DC-DC converter, and the first electrode of the piezoelectric element is connected to a first supply terminal for supplying an output voltage of the converter, by the third switch, which may be a diode.

The invention also relates to an electronic energy conversion system for converting electrical energy that comprises:

an electrical energy converter comprising a piezoelectric element and a plurality of switches adapted to being commanded to alternate phases at substantially constant voltage across the terminals of the piezoelectric element, and phases at substantially constant charge across the terminals of said piezoelectric element; and an electronic control device for controlling the electrical energy converter, the control device being as defined above.

According to another advantageous aspect of the invention, the electronic electrical energy conversion system is a direct (electric) energy conversion system, such as a direct current-direct current (DC-DC) conversion system, or an alternating current-direct current (AC-DC) conversion system.

The invention also relates to a control method for controlling an electrical energy converter, the converter comprising a piezoelectric element and a plurality of switches adapted to being commanded to alternate phases at substantially constant voltage across the terminals of the piezoelectric element, and phases at substantially constant charge across the terminals of said piezoelectric element;

the method being implemented by an electronic control device and comprising the following steps:

measurement of a period of a resonance cycle of the piezoelectric element;

detection of a characteristic event associated with the electrical energy converter, the characteristic event belonging to a current resonance cycle;

computation of at least three subsequent switching time instants during at least one subsequent resonance cycle, each subsequent resonance cycle being posterior to the current resonance cycle, each subsequent switching time instant being computed based on a respective characteristic event, a first subsequent time instant corresponding to the opening of a first switch, a second subsequent time instant corresponding to the closing of a second switch, and a third subsequent time instant corresponding to the opening of the second switch; and commanding of the switching of each of the switches;

the step of commanding comprising a command for the switching of the respective switch at each of the subsequent time instants computed.

BRIEF DESCRIPTION OF THE DRAWINGS

These characteristic features and advantages of the invention will become more clearly apparent upon reading the description that follows, provided solely by way of non-limiting example, and with reference made to the appended drawings, in which.

DETAILED DESCRIPTION

Figure 1:
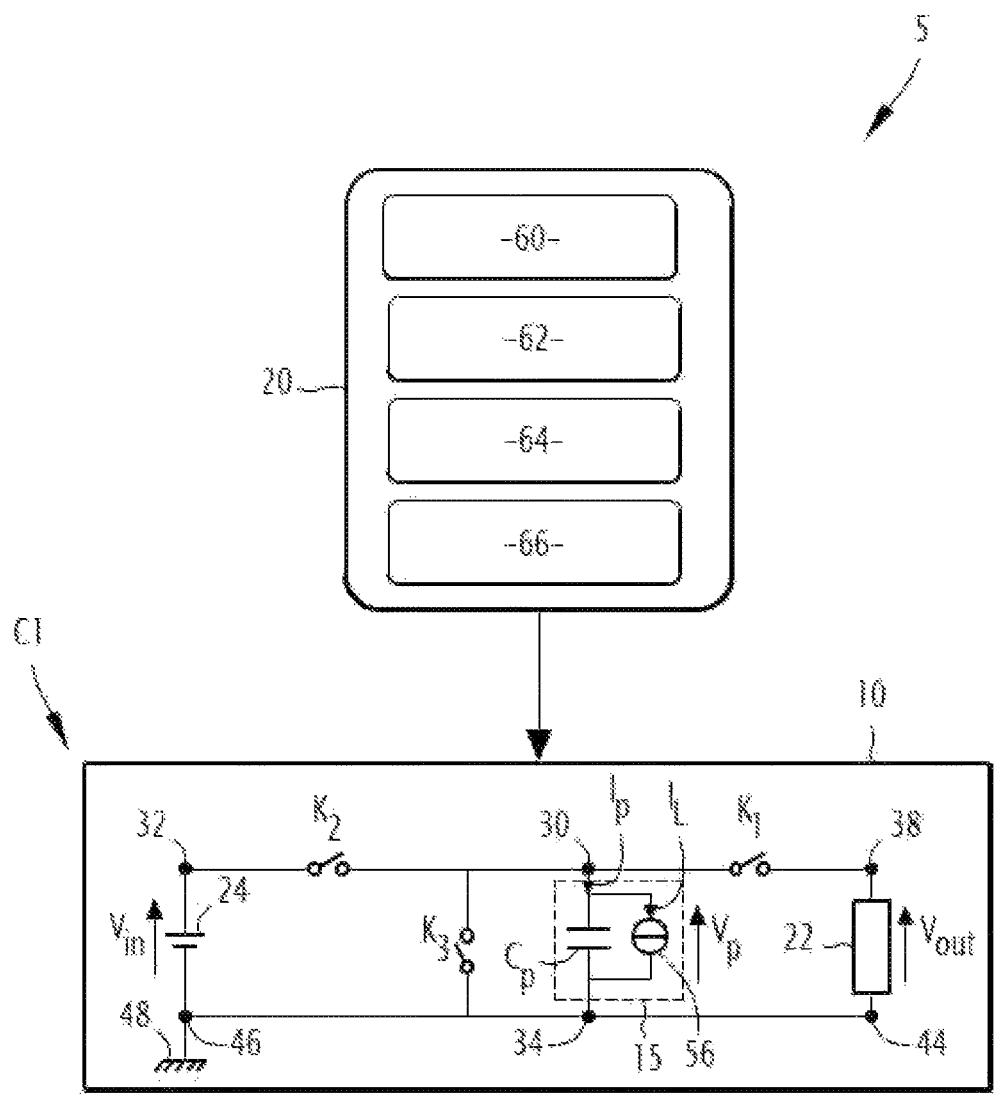
FIG. 1 is a schematic representation of an electronic energy conversion system for converting electrical energy according to the invention, that comprises an electrical energy converter comprising a piezoelectric element and a plurality of switches adapted to being commanded to alternate phases at substantially constant voltage across the terminals of the piezoelectric element, and phases at substantially constant charge across the terminals of said piezoelectric element; and an electronic control device for controlling the electrical energy converter.

In FIG. 1, an electronic electrical energy conversion system 5 comprises an electrical energy converter 10 comprising a piezoelectric element 15 and a plurality of switches $K_1$, $K_2$, $K_3$ that are capable of being commanded to alternate phases at substantially constant voltage across the terminals of the piezoelectric element 15, and phases at substantially constant charge across the terminals of said piezoelectric element 15; and an electronic control device 20 for controlling the electrical energy converter 10.

The electronic electrical energy conversion system 5 is typically a direct (electric) energy conversion system, such as a direct current-direct current (DC-DC) conversion system capable of converting a first DC electrical energy received at the input into a second DC electrical energy delivered at the output, or indeed even an alternating current-direct current (AC-DC) conversion system capable of converting an AC electrical energy received at the input into a DC electrical energy delivered at the output of the conversion system 5.

When the electrical energy conversion system 5 is an AC-DC conversion system, the electrical energy conversion system 5 preferably in addition comprises a voltage rectifier, not shown, connected to the input of the electrical energy converter 10 and capable of rectifying the alternating current (AC) voltage received at the input of the conversion system 5 in order to deliver a rectified electrical voltage at the input of the converter 10, the electrical energy converter 10 preferably being a DC-DC converter capable of converting the DC electrical energy into another DC electrical energy. The voltage rectifier is for example a rectifying bridge, such as a diode bridge. By way of a variant, the voltage rectifier is formed in part by the switches of the converter 10.

The skilled person will observe that these different examples for the conversion system 5, whether it is a DC-DC conversion system or an AC-DC conversion system, are also presented in the patent documents FR 3 086 471 A1 and FR 3 086 472 A1, in particular with regard to the FIGS. 1 to 3, 10, 15, 17 and 19 to 20.

The electrical energy converter 10 is preferably a direct current-direct current converter, and is also referred to as a DC-DC converter. The DC-DC converter generally serves the function of regulating a supply voltage $V_{out}$ of a load 22 to a stable value, while being supplied by a power source 24 that supplies a substantially direct current (DC) voltage $V_{in}$. The energy source 24 is for example a battery or a solar panel.

The electrical energy converter 10 is thus then configured to raise the value of the DC voltage between its input and its output, and is therefore also known as a step-up/boost DC-DC converter, or even an ultra-high step-up/boost DC-DC converter; or else it is configured to lower the value of the DC voltage between its input and its output, and is therefore known as a step-down/buck DC-DC converter, with also a variant ultra-low step-down/buck DC-DC converter.

When the electrical energy converter 10 is a step-down/buck DC-DC converter, the value of the input voltage typically corresponds to the voltage $V_{in}$ of the energy source 24, and the value of the output voltage corresponds to the voltage $V_{out}$ across the terminals of load 22, the voltage $V_{in}$ then being greater than the voltage $V_{out}$.

When the electrical energy converter 10 is a step-up/boost DC-DC converter, the value of the input voltage also typically corresponds to the voltage $V_{in}$ of the energy source 24, and the value of the output voltage corresponds to the voltage $V_{out}$ across the terminals of the load 22, the voltage $V_{in}$ thus then being lower than the voltage $V_{out}$.

When the electrical energy converter 10 is an ultra-low step-down/buck DC-DC converter, the value of the input voltage corresponds for example to the voltage difference $(V_{in}-V_{out})$, and the value of the output voltage corresponds for example to the voltage $V_{out}$, the voltage difference $(V_{in}-V_{out})$ being significantly greater than the voltage $V_{out}$.

When the electrical energy converter 10 is a step-down/buck DC-DC converter, according to one step-down/buck variant, the value of the input voltage corresponds for example to the voltage difference $(V_{in}-V_{out})$, and the value of the output voltage corresponds to the voltage $V_{out}$ across the terminals of the load 22, the voltage difference ($V_{in}$–$V_{out}$) being greater than the voltage $V_{out}$.

The electrical energy converter 10 comprises the piezoelectric element 15, and the control device 20 is configured to cause the piezoelectric material of the piezoelectric element 15 to function at its resonance frequency in order to exploit the charge transfer phases, thereby making it possible to do without needing to use an inductive element, while also regulating the output voltage by maintaining the resonance of the piezoelectric material, that is to say, with repeated switching cycles at an operating frequency depending on the frequency of resonance of the piezoelectric element 15, and by adjusting the time periods of the respective switching phases within the resonance cycle.

Figure 2:
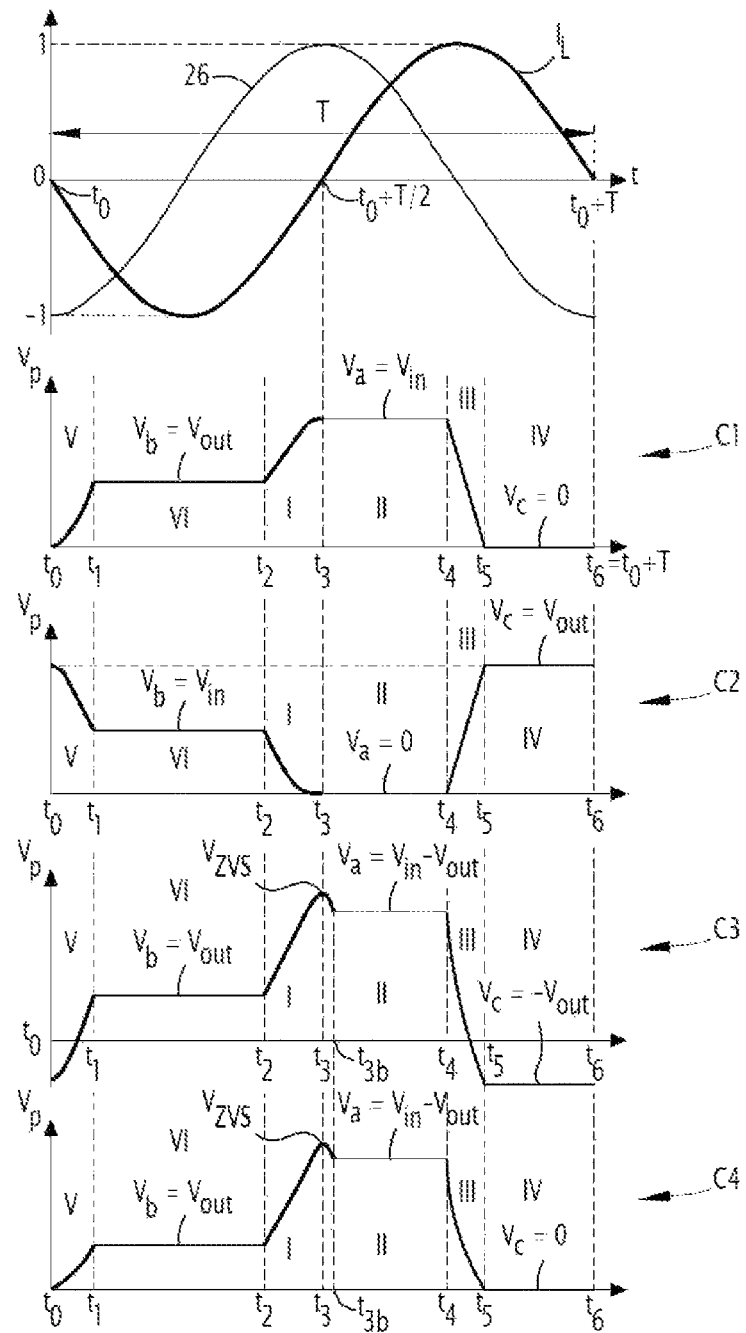
FIG. 2 is a set of curves representing a current flowing through the piezoelectric element; a mechanical deformation of the piezoelectric element; and the voltage across the terminals of the piezoelectric element for different configurations of electrical energy conversions, namely a step-down/buck configuration, a step-up/boost configuration, an ultra-low step-down/buck configuration, and a variant step-down/buck configuration.

As known per se, the mechanical oscillation of the piezoelectric element 15 is approximately sinusoidal, as represented by the curve 26 in FIG. 2 illustrating the mechanical deformation of the piezoelectric element 15 during a respective resonance cycle. An increase or decrease in stored energy over a period leads to an increase or decrease in oscillation amplitude, respectively. Furthermore, during a phase at a substantially constant charge across the terminals of the piezoelectric element 15, that is to say when the piezoelectric element 15 is placed in a substantially open electrical circuit, with a weak exchange of electrical charges between the piezoelectric element 15 and the exterior, an increase in the amplitude of the oscillations generates an increase in the amplitude of the voltage $V_p$ across the terminals of the piezoelectric element 15, and during a phase at substantially constant voltage across the terminals of the piezoelectric element 15, this increase in amplitude of oscillation leads to an increase in a current $I_L$ flowing through the piezoelectric element 15.

The term "substantially constant charge" is understood to refer to an exchange of a charge with the exterior which is less than 10% of the charge which would have been exchanged with the exterior if the voltage had been kept constant. In other words, the term "substantially constant charge" is understood to refer to a variation in charge of less than 10% of the charge which would have been exchanged with the exterior of the piezoelectric element 15 if the voltage across the terminals of the piezoelectric element 15 had been kept constant over the time period considered.

The term "substantially open electrical circuit" is understood to refer to a circuit in which any leakage current leads to a variation in the charge of the piezoelectric element 15 of less than 10% of the charge which would have been exchanged with the exterior of the piezoelectric element 15 if the voltage across the terminals of the piezoelectric element 15 had been kept constant over the time period considered.

The term "substantially constant voltage" is understood to refer to a variation in voltage of less than 20%, preferably less than 10%, of the input or output voltage of the converter 10. By way of example, if the input voltage of the converter 10 is equal to 100V, then the voltage variation during each phase at substantially constant voltage, that is to say over each level at substantially constant voltage, is less than 20% of this voltage, that is to say less than 20V; preferably less than 10% of this voltage, that is to say less than 10V.

The converter 10 thus comprises a plurality of switches $K_1$, $K_2$, $K_3$ that are capable of being commanded to alternate phases at substantially constant voltage, and phases at substantially constant charge across the terminals of the piezoelectric element 15, within substantially constant time periods corresponding to the operating frequency of the converter 10, depending on the resonance frequency—also known as natural frequency—of the piezoelectric element 15. The phases at substantially constant charge provide the ability, under steady state or continuous operating mode, to pass from one constant voltage to another and to close the switches that are to be closed when the voltage at their terminals is preferably zero in order to have so-called Zero Voltage Switching, accordingly also referred to as ZVS (as per the accepted terminology).

The resonance frequency is the frequency at which oscillation occurs of the piezoelectric element 15 and consequently its output current $I_p$, visible in FIGS. 1 and 3 to 5. The conversion cycle is synchronized with a mechanical movement of the piezoelectric element 15, and the control frequency is then set to the mechanical oscillation frequency. In practice, this oscillation frequency depends on the operating point of the converter 10: values of the three levels of voltage and output current. Depending on the operating point, this oscillation frequency typically varies between the so-called series resonance frequency of the piezoelectric ($\omega_s=1/\sqrt{(LC)}$ where L and C correspond to the inductance and capacitance of a resonant branch 56 described here below) and the so-called parallel resonance frequency of the piezoelectric ($\omega_p=1/\sqrt{(L*C*C_p/(C+C_p))}$), both also respectively referred to as resonance frequency and anti-resonance frequency of the piezoelectric element 15. The operating frequency of the converter 10 is thus then comprised between these two resonance and anti-resonance frequencies of the piezoelectric element 15. The operating point varies slowly relative to the oscillation frequency of the piezoelectric element 15. The operating point typically evolves to less than 10 kHz, while the oscillation frequency of the piezoelectric element 15 is typically greater than or equal to 100 kHz. As a result, the operating frequency of the converter 10 evolves little from one period to the next.

The total number of phases at substantially constant voltage, and phases at substantially constant charge across the terminals of the piezoelectric element 15 during one resonance cycle is greater than or equal to six. In the example of FIG. 2, this total number of phases is equal to six.

These successive phases of a resonance cycle will thus be described in the six-phase example shown FIG. 2, according to a generic format corresponding to the different configurations of the converter 10. This generic format is used for representing four non-limiting examples of converters: step-down/buck, step-up/boost, ultra-low step-down/buck, and indeed variant step-down/buck.

In the example of FIG. 2, these different phases correspond to operation in steady state or continuous operating mode of the converter 10, that is to say from the moment when the piezoelectric material achieves resonance with a substantially constant amplitude, and thus with substantially balanced exchanges of energy and charge over each period T of the resonance cycle. In order to simplify the description, the losses in the switches in the 'on' state, as well as the losses in the piezoelectric material at resonance are neglected.

FIG. 2 thus represents the evolution of the current $I_L$ flowing through the piezoelectric element 15; the voltage $V_p$ across the terminals of the piezoelectric element 15, also represented in FIGS. 1 and 3 to 5; and the mechanical deformation of the piezoelectric element 15, represented by the curve 26; this being over the course of a resonance cycle and for four distinct conversion configurations of the converter 10, namely: a first step-down/buck configuration C1;

a second step-up/boost configuration C2; a third ultra-low step-down/buck configuration C3; and a fourth variant step-down/buck configuration C4.

By convention, a first switching time instant, denoted $t_2$, corresponds to the opening of a first switch $K_1$, and the voltage $V_p$ across the terminals of the piezoelectric element 15 then changes from a previous voltage $V_b$ to an open circuit position. At this first switching time instant $t_2$ thus begins a first phase I that lasts until a time instant $t_3$ corresponding to a zero crossing of the current $I_L$ flowing through the piezoelectric element 15. In advance, the time instant $t_2$ has been pre-defined such that at the time instant $t_3$, the voltage $V_p$ across the terminals of the piezoelectric element 15 reaches a value $V_a$ or else a value $V_{ZVS}$ corresponding to the value that enables the switching to zero voltage of the corresponding switch.

At the time instant $t_3$, thus begins a second phase II. At this time instant $t_3$, if the value $V_{ZVS}$ is equal to the value $V_a$, then the piezoelectric element 15 can pass from the phase at a substantially constant charge (or in a substantially open circuit) to a subsequent phase at a voltage substantially constant at the value $V_a$, and the time instant $t_3$ then forms a second switching time instant corresponding to the closing of a second switch $K_2$. In the example of FIG. 2, the second switching time instant is the time instant $t_3$ in the case of the first and second configurations C1, C2.

If at the time instant $t_3$, the value $V_{ZVS}$ is different from the value $V_a$, then the piezoelectric element 15 is maintained in open circuit until the second switch $K_2$ passes through a zero voltage at its terminals, and the second switching time instant corresponding to the closing of the second switch $K_2$ and to the start of the phase at a voltage substantially constant at the value $V_a$ is then denoted $t_{3b}$, as represented in FIG. 2 in the case of the third and fourth configurations C3, C4.

This second phase II is then a phase at a voltage substantially constant at the value $V_a$, and lasts until a time instant $t_4$ which forms an setup or adjustment parameter for setting up or adjusting the converter 10, this time instant $t_4$ serves to enable defining the voltage, the current or even the power desired at the output of the converter 10, as explained here below with regard to FIG. 8.

The time instant $t_4$ then corresponds to the end of the second phase II and to the time instant at which the second switch $K_2$ is then to be opened, the time instant $t_4$ forming a third switching time instant corresponding to the opening of the second switch $K_2$.

At the third switching time instant corresponding to the opening of the second switch $K_2$ begins a third phase III corresponding to a phase at a substantially constant charge, or indeed even in a substantially open circuit, this third phase III lasting up to a time instant $t_5$ defined by the passing of the voltage $V_p$ across the terminals of the piezoelectric element 15 to a new predefined value $V_c$. When the converter 10 comprises three switches $K_1$, $K_2$, $K_3$ that are capable of being commanded to alternate phases at substantially constant voltage, and phases at substantially constant charge across the terminals of the piezoelectric element 15, the time instant $t_5$ forming the end of the third phase III typically corresponds to the closing of a third switch $K_3$, the time instant $t_5$ then forming a fifth switching time instant.

By way of a variant, the end of the third phase III in order to pass on to a fourth phase IV at a voltage substantially constant at the value equal to $V_c$ is obtained via the switching of a corresponding diode, such as a first diode 36 described below in the examples shown in FIGS. 3 and 5.

At the time instant $t_5$ thus then begins a fourth phase IV corresponding to a phase at a voltage substantially constant at the value $V_c$, this fourth phase IV lasting until a time instant $t_0$, or even until a time instant $t_6$ modulo the period T of the resonance cycle defined by the zero crossing of the current $I_L$ flowing through the piezoelectric element 15, and according to a monotonicity opposite to that of the zero crossing at the time instant $t_3$. By convention, the time instant $t_6$ is equal to the sum of the time instant $t_0$ and the period T of the resonance cycle, and is also denoted $(t_0+T)$.

In the example of FIG. 2, the time instant $t_6$ corresponds to the end of a resonance cycle of the piezoelectric element 15, the cycle represented having been defined in relation to the time instants of zero crossing of the current $I_L$ flowing through the piezoelectric element 15, and not in relation to the first switching time instant corresponding to the opening of the first switch $K_1$.

The time instant $t_0$, or even the time instant $t_6$, is obtained via the opening of the third switch $K_3$ when the latter is present, and thus then forms a sixth switching time instant. By way of a variant, the time instant $t_0$, or even the time instant $t_6$, thus then corresponds to the opening of the first diode 36.

From the passing through zero of the current $I_L$ flowing through the piezoelectric element 15 thus then begins a fifth phase V corresponding to a phase at substantially constant charge, this fifth phase V occurring between the time instant $t_6$ and the time instant $t_6+t_1$, or indeed even between the time instant $t_0$ and the time instant $t_1$ in the example of FIG. 2, it being understood that the time instant $t_6$ corresponds to the time instant $t_0$ to within one resonance cycle. The end of this fifth phase V corresponds to the moment when the voltage $V_p$ across the terminals of the piezoelectric element 15 reaches a predefined value $V_b$.

At the time instant $t_6+t_1$, or in the example of FIG. 2 at the time instant $t_1$, thus then begins a sixth phase VI corresponding to a phase at voltage substantially constant at the value $V_b$, the beginning of this sixth phase VI then being obtained by the closing of the first switch $K_1$. The time instant $t_1$, or indeed even the time instant $t_6+t_1$ depending on the current resonance cycle considered, then forms a fourth switching time instant.

The skilled person will then observe that in this example of the six-phase resonance cycle of the converter 10 presented in a generic manner for different configurations C1 to C4 with regard to FIG. 2, the three phases at substantially constant voltage correspond to the predefined values $V_a$, $V_b$ and $V_c$ of the voltage $V_p$ across the terminals of the piezoelectric element 15; and the three phases at substantially constant charge, or indeed in open circuit, across the terminals of the piezoelectric element 15 thus then correspond to the phases where the voltage $V_p$ across the terminals of the piezoelectric element 15 varies from one value to another among the three predefined values $V_a$, $V_b$ and $V_c$, precisely from the value $V_a$ to the value $V_c$, then to the value $V_b$, and so on in the example of FIG. 2.

By convention, when the purpose of the converter 10 is to supply a positive current under a maximum voltage $V_{max}$, the three predefined values $V_a$, $V_b$ and $V_c$ are ordered by descending values with $V_a<V_b<V_c$, and the current $I_L$ flowing through the piezoelectric element 15 is defined as positive when it contributes to supplying a positive current under the voltage $V_{max}$. In a complementary manner, when the purpose of the converter 10 is to draw a positive current under the maximum voltage $V_{max}$, the predefined values $V_a$, $V_b$ and $V_c$ are ordered by descending values thus with $V_a>V_b>V_c$, and the current $I_L$ flowing through the piezoelectric element 15 is defined as positive when it contributes to drawing a positive current under the maximum voltage $V_{max}$.

In the example of FIG. 1, the electrical energy converter 10 is a step-down/buck DC-DC converter corresponding to the first configuration C1 of the example of FIG. 2. The first switch $K_1$ then connects a first electrode 30 of the piezoelectric element 15 to a first supply terminal 38 for supplying the output voltage $V_{out}$, and a second switch $K_2$ connects the first electrode 30 of the piezoelectric element to a first application terminal 32 for applying the input voltage $V_{in}$. As an optional add-on, a third switch $K_3$ connects the first electrode 30 of the piezoelectric element 15 to a second electrode 34 of said piezoelectric element. By way of a variant, the fourth phase at a substantially constant voltage equal to the voltage $V_c$ is obtained via a diode, not shown, and arranged in place of the third switch $K_3$, said diode then connecting the first electrode 30 of the piezoelectric element to the second electrode 34 of said piezoelectric element. According to this variant, said diode is more precisely connected to the first electrode 30 of the piezoelectric element 15 by its cathode, and to the second electrode 34 of said piezoelectric element by its anode.

Figure 3:
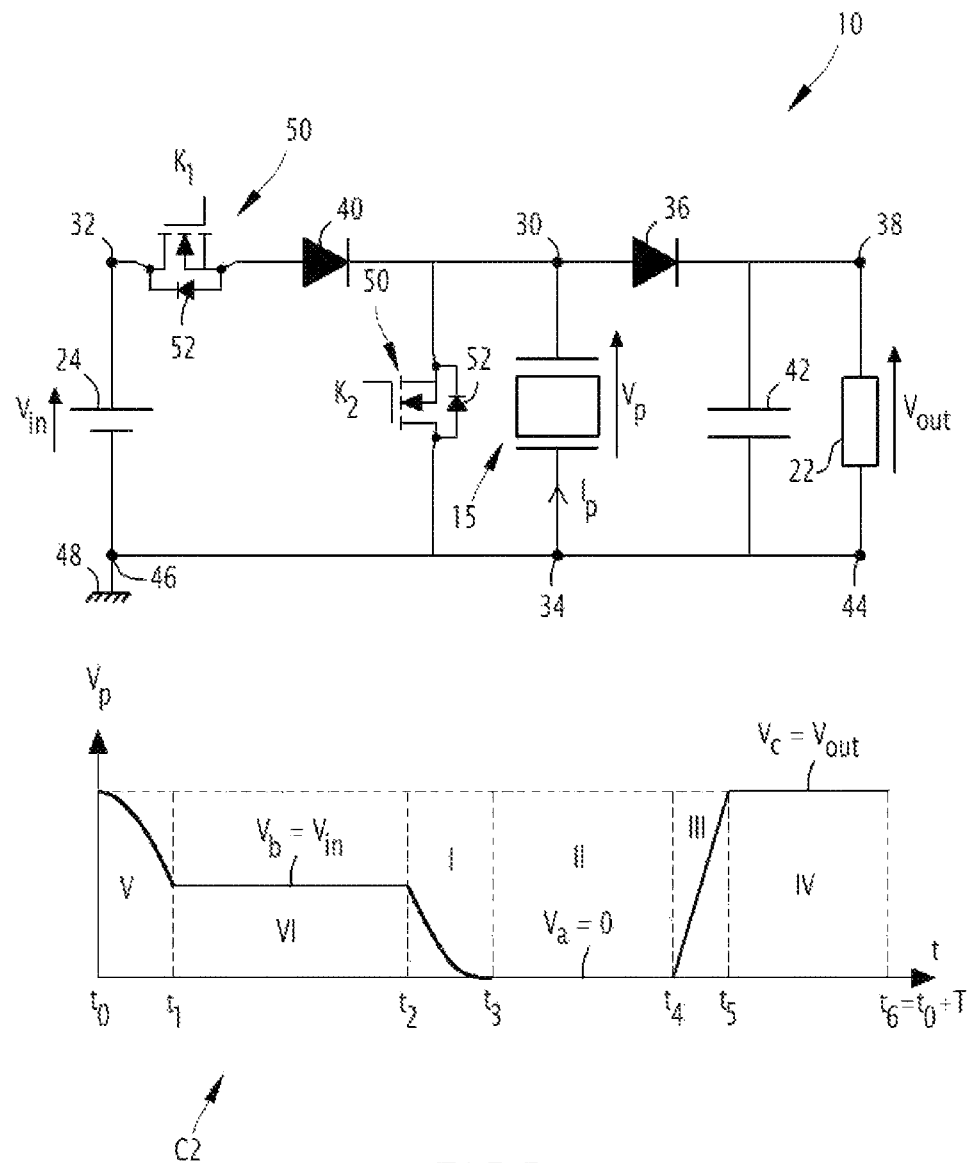
FIG. 3 is a schematic representation of the electrical energy converter of FIG. 1 for the step-up/boost configuration, with a time chart illustrating the evolution of the voltage across the terminals of the piezoelectric element during a resonance cycle of said element.

In FIG. 3, the electrical energy converter 10 is a step-up/boost DC-DC converter typically corresponding to the second configuration C2, and the first switch $K_1$ connects the first electrode 30 of the piezoelectric element 15 to the first application terminal 32 for applying the input voltage $V_{in}$ of the converter, and the second switch $K_2$ connects the first electrode 30 of the piezoelectric element 15 to the second electrode 34 of said piezoelectric element 15. In this example of FIG. 3, the converter 10 comprises only two controlled switches, namely the first and second switches $K_1$, $K_2$, the start time instant $t_5$ and end time instant $t_6$ (or $t_0$ depending on the current resonance cycle considered) of the fourth phase IV are thus then obtained via a first diode 36 connected by its anode to the first electrode 30 of the piezoelectric element, and by its cathode to the first supply terminal 38 for supplying the output voltage $V_{out}$ of the converter, corresponding to a respective terminal of the load 22. More precisely, the start time instant $t_5$ of the fourth phase IV is obtained via the closing of the first diode 36, that is to say via its switching into 'on' mode, and the end time instant $t_6$, $t_0$ of the fourth phase IV is obtained via the opening of the first diode 36, that is to say via its switching into 'off' mode.

In the example of FIG. 3, the converter 10 in addition comprises a second diode 40 connected by its anode to the first switch $K_1$, and by its cathode to the first electrode 30 of the piezoelectric element, and a capacitor 42 connected in parallel to the terminals of the load 22, that is to say between the first terminal 38 and a second terminal 44 for application of the output voltage $V_{out}$. In this example, the second application terminal 44 for applying the output voltage $V_{out}$, a second application terminal 46 for applying the input voltage $V_{in}$ and the second electrode 34 of the piezoelectric element 15 are each connected to an electrical ground 48.

As a variant, not shown in the example of FIG. 3, the electrical energy converter 10 is a step-up/boost DC-DC converter, and the first electrode 30 of the piezoelectric element is connected to the first supply terminal 38 for supplying the output voltage $V_{out}$ of the converter by the third switch $K_3$.

Each switch of the converter 10, namely the first switch $K_1$, the second switch $K_2$, and as an optional add-on the third switch $K_3$, is preferably a unidirectional current and voltage switch. Each switch $K_1$, $K_2$, $K_3$, comprises for example a transistor 50 and an antiparallel diode 52 intrinsic to the transistor 50.

The transistor 50 is, for example, an insulated-gate field-effect transistor, also known as MOSFET (acronym for Metal Oxide Semiconductor Field Effect Transistor). By way of a variant, the transistor 50 is a bipolar transistor; an insulated gate bipolar transistor, also known as an IGBT (abbreviation for Insulated Gate Bipolar Transistor); a transistor based on silicon (Si), a transistor based on GaN (for Gallium Nitride); a transistor based on silicon carbide (SiC), or a transistor based on diamond, or even a thyristor, or indeed even a mechanical switch, such as a MEMS (Micro-ElectroMechanical System) micro-switch.

FIG. 3 also shows a time chart of the evolution of the voltage $V_p$ across the terminals of the piezoelectric element 15 during the six-phase resonance cycle with phases I to VI, this time chart being identical to that shown in FIG. 2 for the second configuration C2.

When the converter 10 is a step-up/boost DC-DC converter and as a variant of the example of FIG. 3, the converter 10 includes the third switch $K_3$ instead of the first diode 36, with the third switch $K_3$ then connecting the first electrode 30 of the piezoelectric element 15 to the first supply terminal 38 for supplying the output voltage $V_{out}$.

Figure 4:
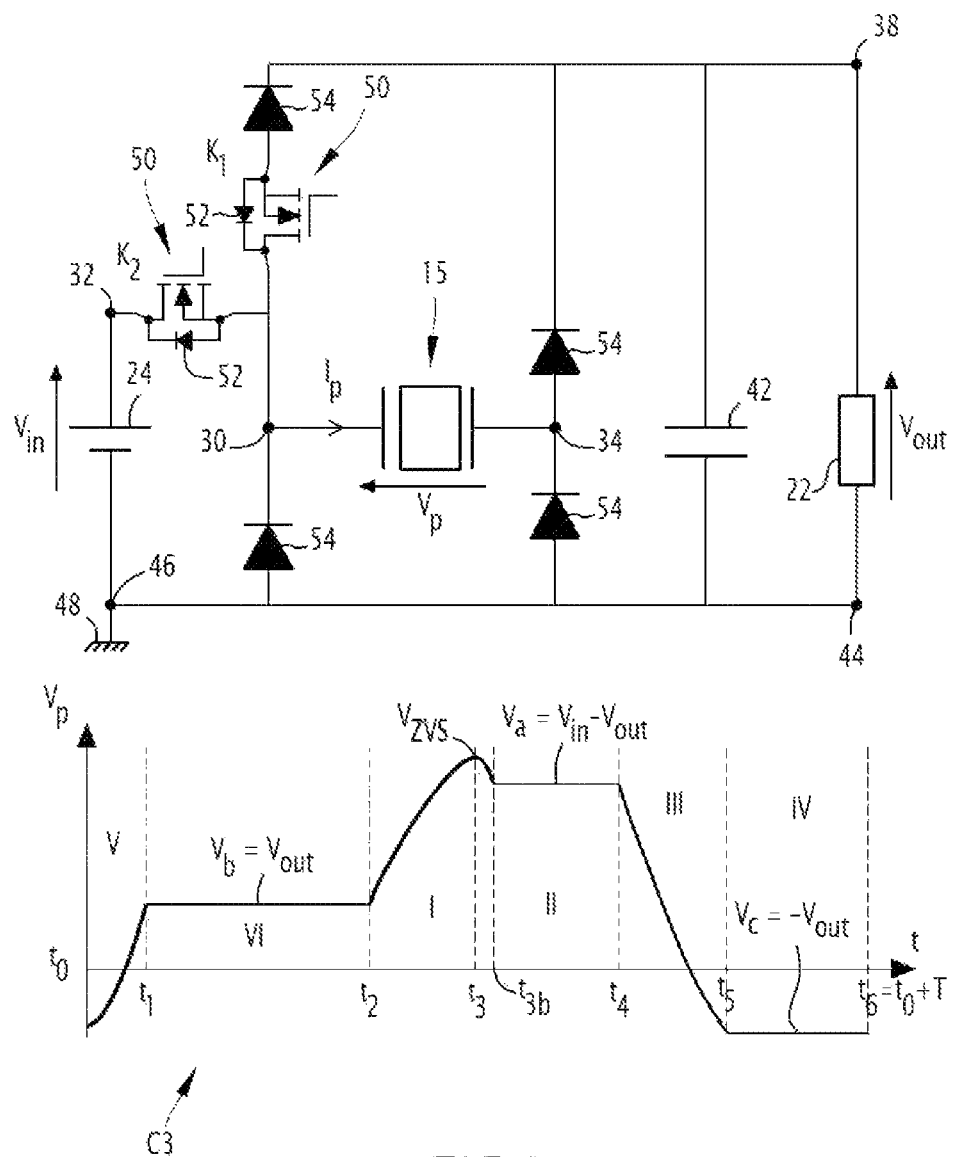
FIG. 4 is a view analogous to that of FIG. 3, for the ultra-low step-down/buck configuration of the electrical energy converter.

In FIG. 4, the electrical energy converter 10 is an ultra-low step-down/buck DC-DC converter, corresponding to the third configuration C3 of FIG. 2. The first switch $K_1$ connects the first electrode 30 of the piezoelectric element to the first supply terminal 38 for supplying the output voltage $V_{out}$, and the second switch $K_2$ connects the first electrode 30 of the piezoelectric element to the first application terminal 32 for applying the input voltage $V_{in}$. In this example, the converter 10 comprises only two controlled switches, namely the first and second switches $K_1$, $K_2$, and the converter 10 then in addition comprises a plurality of additional diodes 54 forming with the piezoelectric element 15 a bridge, schematically represented in the form of an H-shaped bridge, with the ends of the branches of the bridge interconnected. In this example, the converter 10 also comprises the capacitor 42 connected in parallel and to the terminals of the load 22, that is to say between the first and second supply terminals 38, 44 for supplying the output voltage $V_{out}$. The second supply terminal 44 for supplying the output voltage $V_{out}$, and the second application terminal 46 for applying the input voltage $V_{in}$ are for example connected to the electrical ground 48.

FIG. 4 also shows a time chart of evolution of the voltage $V_p$ across the terminals of the piezoelectric element 15 during the resonance cycle, this time chart being identical to that of FIG. 2 for the third configuration C3.

Figure 5:
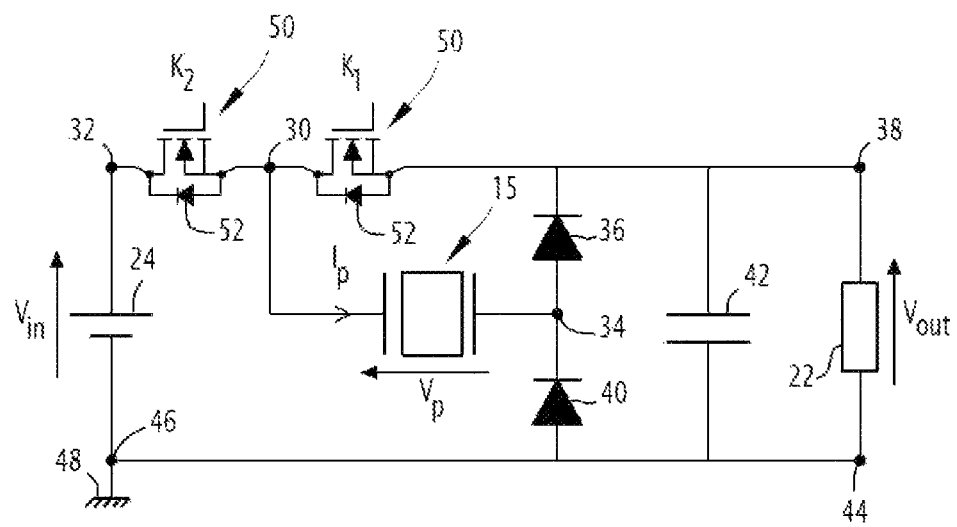
FIG. 5 is a view analogous to that of FIGS. 3 and 4, for the variant step-down/buck configuration of the electrical energy converter.
Figure 5:
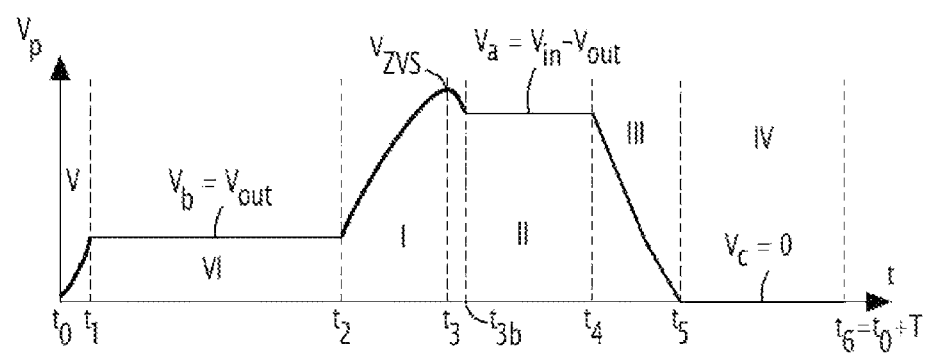

In FIG. 5, the electrical energy converter 10 is a DC-DC converter according to a step-down/buck variant, corresponding to the fourth configuration C4. In this example, the first switch $K_1$ connects the first electrode 30 of the piezoelectric element 15 to the first application terminal 38 for applying the output voltage $V_{out}$, and the second switch $K_2$ connects the first electrode 30 of the piezoelectric element to the first application terminal 32 for applying the input voltage $V_{in}$. In the example of FIG. 5, the converter 10 comprises only two switches, namely the first and second switches $K_1$, $K_2$, and the fourth phase corresponding to the phase at a voltage substantially constant at the value $V_c$ is obtained via the first diode 36 in series with the switch $K_1$, connecting the second electrode 34 of the piezoelectric element to the first electrode 30 of the piezoelectric element.

The first diode 36 is connected by its anode to the second electrode 34 of the piezoelectric element, and by its cathode to the switch $K_1$.

In this example, the converter 10 in addition comprises the second diode 40 connecting the second electrode 34 of the piezoelectric element to the second supply terminal 44 for supplying the output voltage $V_{out}$, the second diode 40 being connected by its cathode to the second electrode 34 of the piezoelectric element, and by its anode to the second terminal 44, and the capacitor 42 between the first and second supply terminals 38, 44 for supplying the output voltage $V_{out}$, that is to say to the terminals and in parallel with the load 22. The second supply terminal 44 for supplying the output voltage $V_{out}$ and the second application terminal 46 for applying the input voltage $V_{in}$ are for example connected to the electrical ground 48.

Also represented in the FIG. 5 is a time chart of evolution of the voltage $V_p$ across the terminals of the piezoelectric element 15 during the resonance cycle, this time chart being identical to that of FIG. 2 for the fourth configuration C4.

The piezoelectric element 15 is known per se, and is typically modelled, close to the resonance mode used, in the form of a capacitor $C_p$ and the resonant branch 56 connected in parallel with the capacitor $C_p$, the capacitor $C_p$ and the resonant branch 56 being connected between the first and second electrodes 30, 34 of the piezoelectric element. The resonant branch 56 is typically an RLC branch formed of a capacitor, a resistor and an inductor connected in series and not shown. The voltage $V_p$ across the terminals of the piezoelectric element then typically corresponds to the voltage across the terminals of the capacitor $C_p$.

The electronic control device 20 is configured to control the electrical energy converter 10, in particular to control the commanding of the switches $K_1$, $K_2$, $K_3$, of the converter, in order to alternate the phases at substantially constant voltage across the terminals of the piezoelectric element 15, and the phases at substantially constant charge, that is to say in substantially open circuit, across the terminals of said piezoelectric element 15.

The electronic control device 20 comprises a measurement module 60 for measuring the period T of the resonance cycle of the piezoelectric element 15, an event detection module 62 for detecting at least one characteristic event associated with the converter 10 and belonging to a current resonance cycle; and a command module 64 for commanding the respective switching of each switch $K_1$, $K_2$, $K_3$.

According to the invention, the electronic control device 20 in addition comprises a computation module 66 for computing at least three subsequent switching time instants $t_2$, $t_3$ or $t_{3b}$, $t_4$ during at least one subsequent resonance cycle, each subsequent switching time instant being computed based on a respective characteristic event, and the command module 64 is then configured to command the switching of the respective switch $K_1$, $K_2$ at each of the subsequent time instants $t_2$, $t_3$, $t_{3b}$, $t_4$ computed.

The measurement module 60, the event detection module 62, the command module 64, and the computation module 66 are for example each produced in the form of an electronic circuit comprising one or more electronic components, and in particular comparators when comparisons are performed.

As a variant, the measurement module 60, the event detection module 62, the command module 64, and the computation module 66 are each produced in the form of a programmable logic component, such as an FPGA (abbreviation for Field Programmable Gate Array), or in the form of an integrated circuit, such as an ASIC (acronym for Application Specific Integrated Circuit), or even in the form of a computing unit, such as a microcontroller, a processor. As a further variant, the measurement module 60, the event detection module 62, the command module 64, and the computation module 66 are implemented together within a single hardware component, such as a single programmable logic component, a single integrated circuit, or single computing unit.

Figure 13:
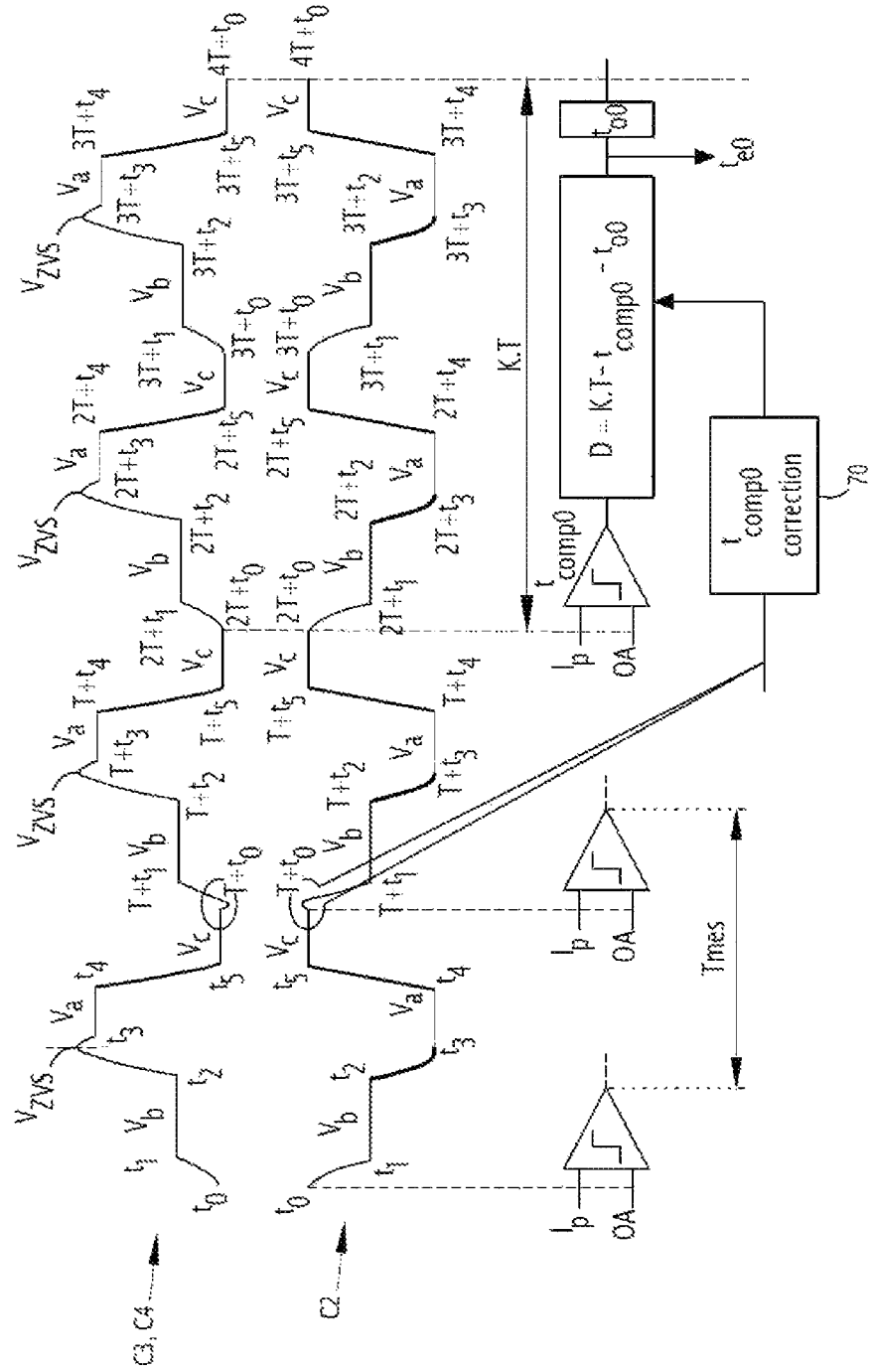
FIG. 13 is a view analogous to that of FIGS. 6 to 12, illustrating the computation of a sixth subsequent switching time instant corresponding to the opening of the third switch of the electrical energy converter.

The measurement module 60 is configured to measure the period T of the resonance cycle of the piezoelectric element 15. The measurement module 60 is for example configured to measure this period T of the resonance cycle by detecting two successive characteristic events of the same type, the period T of the resonance cycle then corresponding to the time period elapsed between the two successive characteristic events. The type of characteristic event used for the measurement of the period T of the resonance cycle is typically a zero crossing following a predefined monotonicity of the internal current $I_L$ of the piezoelectric element 15, as illustrated in FIG. 13 with the measurement of a time period Tmes between the two zero crossings following a predefined monotonicity of the internal current $I_L$.

In the example of FIG. 2, the measurement module 60 is configured to measure the period T of the resonance cycle by detecting two zero crossings by decreasing value of the internal current $I_p$ of the piezoelectric element 15, that is to say, following a decrease in said internal current $I_p$, the period T of the resonance cycle then corresponding to the time period elapsed between these two successive zero crossings by decreasing values. By way of a variant, the measurement module 60 is configured to measure the period T of the resonance cycle by detecting two successive zero crossings by increasing values of the internal current $I_L$ of the piezoelectric element 15, that is to say two successive zero crossings occurring by increase in said internal current $I_L$.

The event detection module 62 is configured to detect at least one characteristic event associated with the electrical energy converter 10, the at least one characteristic event belonging to the current resonance cycle.

Each characteristic event is selected from the group consisting of: a zero crossing of the current $I_L$ flowing through the piezoelectric element 15, the passing of the voltage $V_p$ across the terminals of the piezoelectric element 15 to a predefined value $V_{ref0}$; the passing of the voltage between an electrode 30, 34 of the piezoelectric element 15 and a reference potential to a predefined value; the passing of the voltage $V_p$ across the terminals of the piezoelectric element 15 to a respective substantially constant voltage value $V_a$, $V_b$, $V_c$, and the passing of the voltage between the electrode 30, 34 of the piezoelectric element 15 and the reference potential to a respective substantially constant voltage value. The one or more characteristic event(s) used preferably in accordance with the associated switching time instant will be described in more detail below.

The command module 64 is configured to command the switching of each of the switches used to alternate the phases at substantially constant voltage across the terminals of the piezoelectric element 15, and the phases at substantially constant charge across the terminals of said piezoelectric element 15, in particular to command the first switch $K_1$, and the second switch $K_2$, indeed by way of optional add-on, even the third switch $K_3$.

The skilled person will no doubt understand that the terminals of the piezoelectric element 15 correspond to the first 30 and second 34 electrodes of the piezoelectric element 15, and are thus then also denoted as terminals 30, 34 of the piezoelectric element. In the present description, the terminals 30, 34 of the piezoelectric element are thus then identical to the electrodes 30, 34 of the piezoelectric element.

In the examples of FIGS. 1 to 5, and in particular of the first, second, third, and fourth configurations C1, C2, C3, C4, during the current resonance cycle, the first switching time instant $t_2$ corresponds to the opening of the first switch $K_1$, the second switching time instant $t_3$, $t_{3b}$ corresponds to the closing of the second switch $K_2$, and the third switching time instant $t_4$ corresponds to the opening of the second switch $K_2$.

As an optional add-on, the fourth switching time instant $t_1$ (or $t_6+t_1$) corresponds to the closing of the first switch $K_1$.

As a further optional add-on, when the converter 10 comprises the third switch $K_3$, the fifth switching time instant $t_5$ corresponds to the closing of the third switch $K_3$, and the sixth switching time instant $t_0$ corresponds to the opening of the third switch $K_3$.

The computation module 66 is configured to compute at least three subsequent switching time instants $t_{2*}$, $t_{3*}$ or $t_{3b*}$, $t_{4*}$ during at least one subsequent resonance cycle, each subsequent resonance cycle being posterior to the current resonance cycle, each subsequent switching time instant $t_{2*}$, $t_{3*}$ or $t_{3b*}$, $t_{4*}$ being computed based on a respective characteristic event.

Among the subsequent switching time instants computed by the computation module 66, a first subsequent time instant $t_{2*}$ corresponds to the opening of the first switch $K_1$ during the subsequent resonance cycle; and a second subsequent time instant $t_{3*}$ or $t_{3b*}$ corresponds to the closing of the second switch $K_2$, the second subsequent time instant $t_{3b*}$ corresponding to the closing of said second switch $K_2$ following an excursion of the voltage $V_p$ across the terminals of the piezoelectric element 15 to the voltage value $V_{ZVS}$ then enabling the soft switching of the second switch $K_2$, that is to say switching at zero voltage of said second switch $K_2$, this excursion to the voltage $V_{ZVS}$ being advantageously implemented for the third and fourth configurations C3, C4. Among the subsequent switching time instants computed by the computation module 66, a third subsequent time instant $t_{4*}$ corresponds to the opening of the second switch $K_2$ during the subsequent resonance cycle.

As add-on, a fourth subsequent time instant $t_{1*}$ corresponds to the closing of the first switch $K_1$ during the subsequent resonance cycle.

As a further optional add-on, in particular when the converter 10 comprises three switches, and thus in addition the third switch $K_3$, a fifth subsequent time instant $t_{5*}$ corresponds to the closing of the third switch $K_3$ during the subsequent resonance cycle. According to this optional add-on, a sixth subsequent time instant $t_{0*}$ corresponds to the opening of the third switch $K_3$ during the subsequent resonance cycle.

The computation module 66 is preferably configured to compute each subsequent time instant $t_{2*}$, $t_{3*}$ or $t_{3b*}$, $t_{4*}$, $t_{1*}$, $t_{5*}$, $t_{0*}$ as a function of a time difference equal to K times the period T of the resonance cycle of the piezoelectric element 15, K being an integer with a value greater than or equal to 1.

Each subsequent switching time instant $t_{2*}$, $t_{3*}$, $t_{3b*}$, $t_{4*}$, $t_{1*}$, $t_{5*}$, $t_{0*}$ is preferably equal to the sum of the corresponding switching time instant $t_2$, $t_3$ or $t_{3b}$, $t_4$, $t_1$, $t_5$, $t_0$ during the current resonance cycle and said time difference equal to K·T. In particular, the first subsequent time instant $t_{2*}$ is equal to the sum of the first time instant $t_2$ and the time difference K·T; the second subsequent time instant $t_{3*}$, $t_{3b*}$ is equal to the sum of the second switching time instant $t_3$, $t_{3b}$ and the time difference K·T; and the third subsequent time instant $t_{4*}$ is equal to the sum of the fourth switching time instant $t_4$ and the time difference K·T.

As an optional add-on, the fourth subsequent time instant $t_{1*}$ is equal to the sum of the fourth switching time instant $t_1$ and the time difference K·T. As a further optional add-on, the fifth subsequent time instant $t_{5*}$ is equal to the sum of the fifth switching time instant $t_5$ and the time difference K·T; and the sixth subsequent time instant $t_{0*}$ is equal to the sum of the sixth switching time instant $t_0$ and the time difference K·T.

As an optional add-on, the value of the number K taken into account in order to define the time difference is determined as a function of the duration of the period T of the resonance cycle. According to this optional add-on, the shorter the duration of said period T of the resonance cycle, the higher the value of the number K. The value of the number K is preferably greater than 2.

As a further optional add-on, the computation module 66 is configured to compute the subsequent switching time instants $t_{2*}$, $t_{3*}$, $t_{3b*}$, $t_{4*}$, $t_{1*}$, $t_{5*}$, $t_{0*}$ during a plurality of successive subsequent resonance cycles, the at least three subsequent time instants $t_{2*}$, $t_{3*}$, $t_{3b}$, $t_{4*}$ thus then being computed for each of said successive subsequent cycles. For the first, second, and third subsequent time instants $t_{2*}$, $t_{3*}$, $t_{3b*}$, $t_{4*}$, the characteristic event based on which the respective subsequent switching time instant is computed, is preferably the zero crossing of the current $I_L$ flowing through the piezoelectric element 15, and for example the zero crossing and by decreasing values of said current $I_L$ in the piezoelectric element 15. The computation module 66 is thus then configured to compute each of the first, second, and third subsequent time instant $t_{2*}$, $t_{3*}$, $t_{3b*}$, $t_{4*}$ as being equal—based on the characteristic event, that is to say based on the zero crossing of the current $I_L$—to the sum of the time difference K·T and a respective reference time period. Each respective reference time period is preferably determined based on the corresponding switching time instant $t_2$, $t_3$, $t_{3b}$, $t_4$, that is to say based on respectively the first $t_2$, the second $t_3$, $t_{3b}$ and the third $t_4$ switching time instant, during the current resonance cycle or indeed based on a time instant associated with the start of the period T of the resonance cycle, such as the sixth switching time instant $t_0$.

Figure 6:
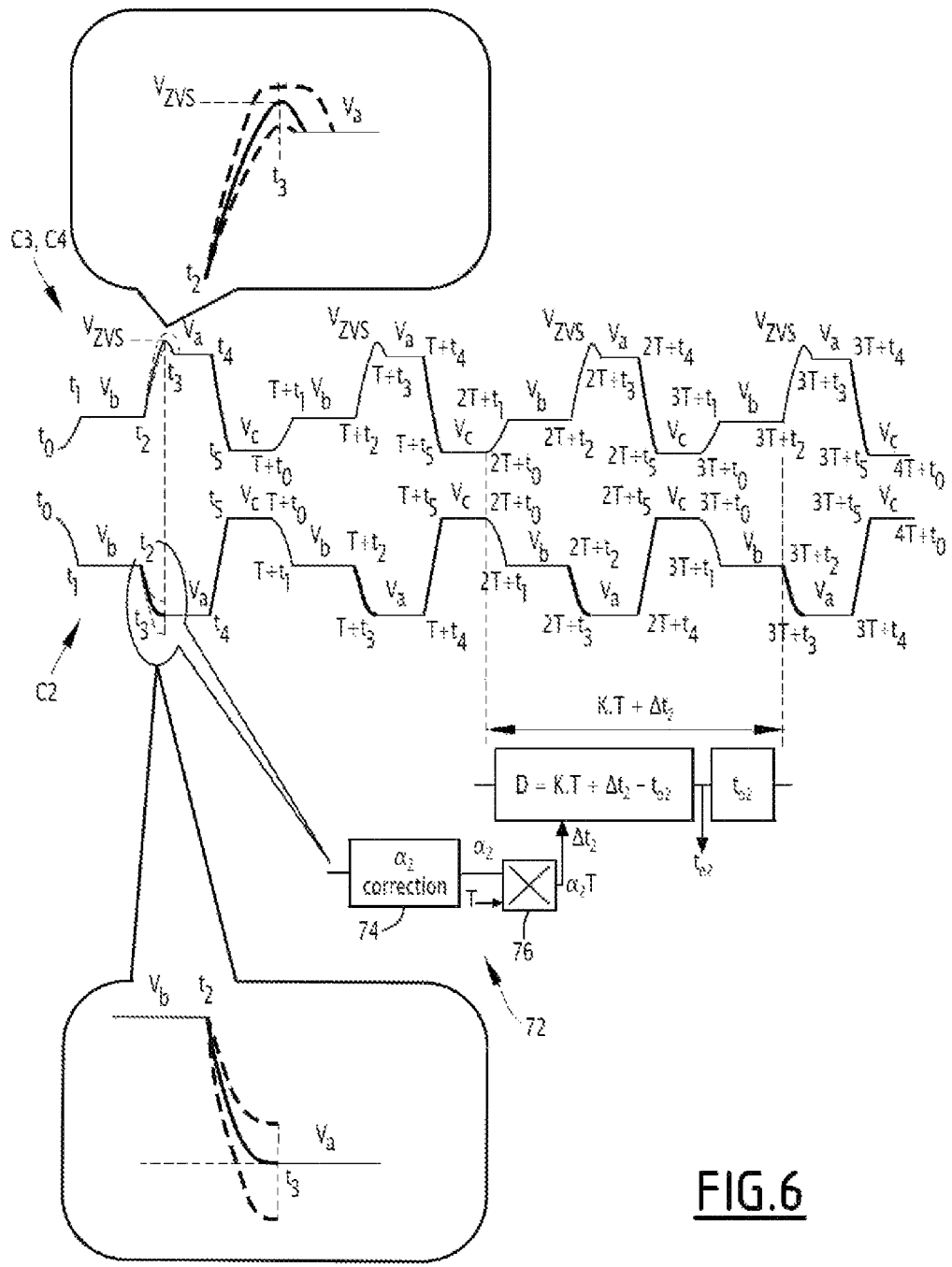
FIG. 6 illustrates the computation of a first subsequent switching time instant corresponding to the opening of a first switch, with two time charts representing the evolution of the voltage across the terminals of the piezoelectric element and during a number of/several successive resonance cycles for the ultra-low step-down/buck configuration or the variant step-down/buck configuration, and for the step-up/boost configuration.

According to this add-on, for the first subsequent time instant $t_{2*}$, the respective reference time period $\Delta t_2$ is equal to the time period elapsed between the associated characteristic event and the first switching time instant $t_2$ during the current resonance cycle, that is to say, to the time period between the time instant $t_0$ and the first switching time instant $t_2$, ie to the difference $(t_2-t_0)$ in the example of FIGS. 2 and 6. For the second subsequent time instant $t_{3*}$, the respective reference time period is for example equal to half of the period T of the resonance cycle, that is to say to the half-period T/2 of the resonance cycle. By way of a variant, the respective reference time period for the second subsequent time instant $t_{3*}$ is equal to the time period elapsed between the characteristic event, such as the zero crossing of the current $I_L$, and the second switching time instant $t_3$ during the current resonance cycle, this reference time period $\Delta t_3$ then being equal to the time period between the time instant $t_0$ and the second switching time instant $t_3$, that is to say, to the difference $(t_3-t_0)$ in the example of FIGS. 2 and 7. For the second subsequent time instant $t_{3b*}$ following the prior excursion to the voltage value $V_{ZVS}$, the respective reference time period $\Delta t_{3b}$ is typically equal to the time period elapsed between the characteristic event and the second switching time instant $t_{3b}$ during the current resonance cycle, this respective reference time period then being equal to the time period between the time $t_0$ and the second switching time instant $t_{3b}$, that is to say, to the difference $(t_{3b}-t_0)$ in the example of FIGS. 2 and 7. For the third subsequent time instant $t_{4*}$, the respective reference time period $\Delta t_4$ is equal to the time period elapsed between the characteristic event and the third switching time instant $t_4$ during the current resonance cycle, this respective reference time period $\Delta t_4$ thus then being equal to the time period between the time instant $t_0$ and the third switching time instant $t_4$, that is to say, to the difference $(t_4-t_0)$ in the example of FIGS. 2 and 8.

Figure 9:
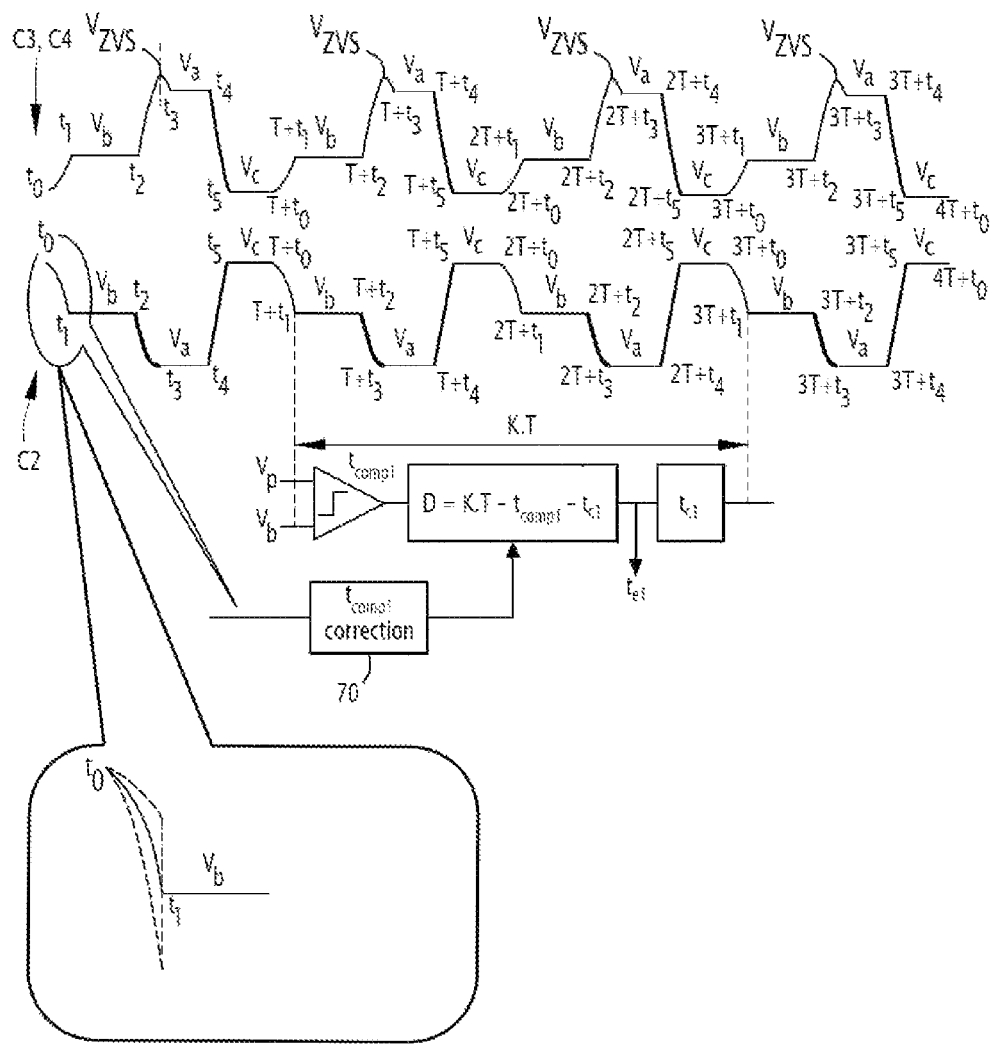
FIG. 9 is a view analogous to that of FIGS. 6 to 8, illustrating the computation of a fourth subsequent switching time instant corresponding to the closing of the first switch of the electrical energy converter.

As an optional add-on, the characteristic event associated with the fourth subsequent time instant $t_{1*}$, is the passing of the voltage $V_p$ across the terminals of the piezoelectric element 15 to a respective substantially constant voltage value, such as the value $V_b$ in the example of FIG. 9. By way of a variant, the characteristic event associated with the fourth subsequent time instant $t_{1*}$ is the zero crossing of the current $I_L$ flowing through the piezoelectric element 15, and for example the zero crossing by decreasing values of said current $I_L$, as in the example of FIG. 10.

According to this optional add-on, when the characteristic event associated with the fourth subsequent time instant $t_{1*}$ is the passing of the voltage $V_p$ to a respective substantially constant voltage value, the computation module 66 is configured to compute the fourth subsequent time instant $t_{1*}$ as a function of the time difference K·T alone, the fourth subsequent time instant $t_{1*}$ being equal to the time difference K·T as from said characteristic event, that is to say, to the time difference K·T added to the time instant of detection of said characteristic event.

According to this optional add-on, when the characteristic event associated with the fourth subsequent time instant $t_{1*}$ is the zero crossing of the current $I_L$, the computation module 66 is configured to compute the fourth subsequent time instant $t_{1*}$ as being equal to the sum of the time difference K·T and a respective reference time period $\Delta t_1$. This respective reference time period $\Delta t_1$ thus then corresponds to the time period elapsed between the characteristic event and the fourth switching time instant $t_1$ during the current resonance cycle, this respective reference time period $\Delta t_1$ then being equal to the time period between the time instant $t_0$ and the fourth switching time instant $t_1$, that is to say, to the difference $(t_1-t_0)$ in the example of FIG. 10.

Figure 11:
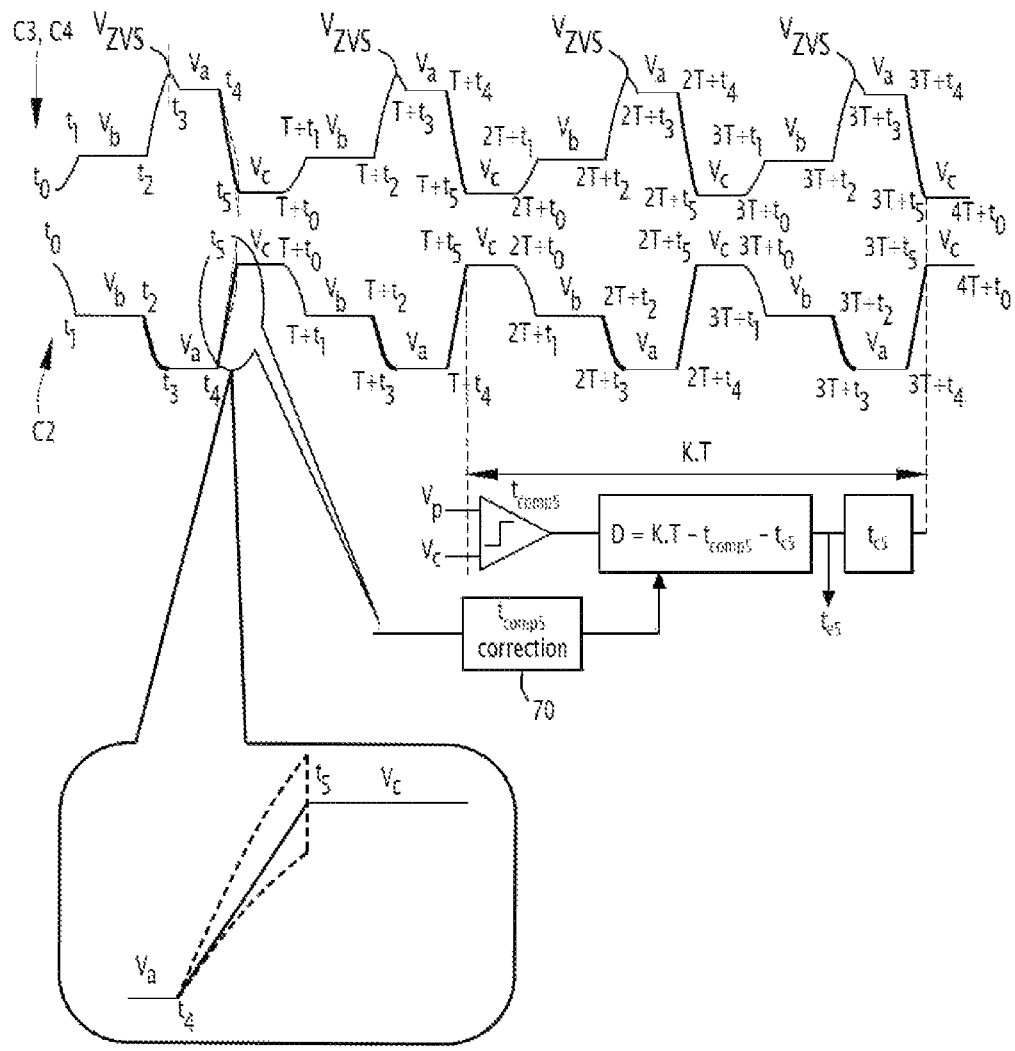
FIG. 11 is a view analogous to that of FIGS. 6 to 10, illustrating the computation of a fifth subsequent switching time instant corresponding to the closing of a third switch of the electrical energy converter.

As a further optional add-on, when the converter 10 comprises three switches, and thus in addition the third switch $K_3$, the characteristic event associated with the fifth subsequent time instant $t_{5*}$ is the passing of the voltage $V_p$ across the terminals of the piezoelectric element 15 to a respective substantially constant voltage value, such as the value $V_c$ in the example of FIG. 11. By way of a variant, the characteristic event associated with the fifth subsequent time instant $t_{5*}$ is the zero crossing of the current $I_L$ flowing through the piezoelectric element 15, and for example the zero crossing by decreasing values of said current $I_L$.

According to this optional add-on, when the characteristic event associated with the fifth subsequent time instant $t_{5*}$ is the passing of the voltage $V_p$ to the respective substantially constant voltage value, the computation module 66 is configured to compute the fifth subsequent time instant $t_{5*}$ based on the time difference K·T alone, the fifth subsequent time instant $t_{5*}$ being equal to the time difference K·T as from said characteristic event, that is to say, to the time difference K·T added to the time instant of detection of said characteristic event.

According to this optional add-on, when the characteristic event associated with the fifth subsequent time instant $t_{5*}$ is the zero crossing of the current $I_L$, the computation module 66 is configured to compute the fifth subsequent time instant $t_{5*}$ as being equal, based on the characteristic event, to the sum of the time difference K·T and a respective reference time period $\Delta t_5$. This respective reference time period $\Delta t_5$ is then typically equal to the time period elapsed between the characteristic event and the fifth switching time instant $t_5$ during the current resonance cycle, this respective reference time period $\Delta t_5$ being equal to the time period between the time instant $t_0$ and the fifth switching time instant $t_5$, that is to say, to the difference $(t_5-t_0)$ in the example of FIG. 12.

As a further optional add-on, the characteristic event associated with the sixth subsequent time instant $t_{0*}$ is the zero crossing of the current $I_L$ flowing through the piezoelectric element 15, and for example the zero crossing by decreasing values of said current $I_L$, as in the example of FIG. 13. By way of a variant, the characteristic event associated with the sixth subsequent time instant $t_{0*}$ is the passing of the voltage $V_p$ across the terminals of the piezoelectric element to a predefined value, such as the value $V_{ref0}$ in the example of FIG. 14.

Still according to this optional add-on, the computation module 66 is thus then configured to compute the sixth subsequent time instant $t_{0*}$ based on the time difference K·T alone, the sixth subsequent time instant $t_{0*}$ being equal to the time difference K·T as from said characteristic event, that is to say, to the time difference K·T added to the time instant of detection of said characteristic event.

The event detection module 62 is for example configured to detect the characteristic event associated with the respective subsequent time instant by comparison, with a corresponding predefined value and via a respective comparator, of a quantity selected from among the deformation of the piezoelectric element 15 (typically via a separate electrode disposed against the piezoelectric element 15), the current $I_L$ flowing through the piezoelectric element 15, the voltage $V_p$ across the terminals of the piezoelectric element 15, and the voltage between a terminal 30, 34 of the piezoelectric element 15 and a reference potential, such as the potential of the electrical ground 48 of the electrical energy converter.

As an optional add-on, the computation module 66 is thus then configured to compute a respective subsequent time instant further as a function of a comparison time period associated with the comparator used to detect the characteristic event of said respective subsequent time instant. The comparison time period, such as the time period $t_{comp1}$ in the example of FIG. 9, the time period $t_{comp5}$ in the example of FIG. 11, or even the time period $t_{comp0}$ in the example of FIG. 13, is a time period required for the comparator to perform said comparison and generate an event detection signal for detecting the corresponding characteristic event.

According to this optional add-on, the computation module 66 is thus then typically configured to subtract said comparison time period $t_{comp1}$, $t_{comp5}$, $t_{comp0}$, from the time difference K·T.

Still according to this optional add-on, each comparison time period $t_{comp1}$, $t_{comp5}$, $t_{comp0}$, is for example a predefined measurement.

As a further optional add-on, each comparison time period $t_{comp1}$, $t_{comp5}$, $t_{comp0}$, may also be modified via a first regulation loop 70 as a function of a difference between the quantity observed, such as the voltage $V_p$ across the terminals of the piezoelectric element 15, and the corresponding predefined value upon the detection of one or more event(s) during a previous resonance cycle. In the example of FIG. 9, the first regulation loop 70 over the comparison time period $t_{comp1}$ is represented by the block denoted as "$t_{comp1}$ correction", the regulation being performed in the example of FIG. 9 as a function of the difference during a previous resonance cycle, between the voltage $V_p$ across the terminals of the piezoelectric element and the predefined value $V_b$ upon the detection of one or more event(s) during this previous resonance cycle. In the example of FIG. 11, the first regulation loop 70 for modifying the comparison time period $t_{comp5}$ is represented by the block denoted as "$t_{comp5}$ correction", the regulation being performed in this example as a function of the difference during a previous resonance cycle, between the voltage $V_p$ across the terminals of the piezoelectric element and the predefined value $V_c$ upon the detection of one or more event(s) during this previous resonance cycle. In the example of FIG. 13, the first regulation loop 70 for modifying the comparison time period $t_{com0}$ is represented via the block denoted as "$t_{comp0}$ correction", and in this example the regulation is performed as a function of the difference during a previous resonance cycle, between the voltage $V_p$ across the terminals of the piezoelectric element 15 and the predefined value $V_c$ upon the detection of one or more event(s) during this previous resonance cycle. In this example of FIG. 13, the first regulation loop 70 is further capable of verifying whether the exit from the zone at substantially constant voltage $V_c$ has indeed taken place at a current zero.

As a further optional add-on, when the first regulation loop 70 for modifying the comparison time period is implemented as a function of a difference between the voltage $V_p$ across the terminals of the piezoelectric element 15 and a respective predefined value, such as the value $V_c$ in the example of FIG. 11, the first regulation loop 70 is preferably configured to perform this regulation via a measurement of the envelope of the signal of the voltage $V_p$, preferably still, with the implementation bounded by two end points, namely a minimum end point and a maximum end point on the value of the comparison time period $t_{comp5}$, in order to further augment the operational robustness of said first regulation loop 70. In FIG. 11, the dashed lines between the switching time instants $t_4$ and $t_5$ represent the typical evolving changes in the voltage $V_p$, if the opening at the third switching time instant $t_4$ occurs too early or too late, and thus provide an idea of what is to be observed: over/under voltage as compared to the predefined value $V_c$, positive or negative derivative on application of the predefined value $V_c$. In the case where the third switching time instant $t_4$ arrives too early, then the voltage $V_p$ is greater than the predefined value $V_c$ at the following switching time instant $t_5$; and conversely if the third switching time instant $t_4$ arrives too late, then the voltage $V_p$ is lower than the predefined value $V_c$ at the following switching time instant $t_5$. This can be detected via the measurement either of the envelope of the voltage $V_p$ or of a peak value of the voltage $V_p$. A skilled person will then observe that the measurement of the envelope is easier to implement than an instantaneous measurement of the voltage $V_p$ at the time instant $t_5$.

The command module 64 is thus then configured to command the switching of each respective switch $K_1$, $K_2$, $K_3$, at each of the subsequent time instants $t_{2*}$, $t_{3*}$, $t_{3b*}$, $t_{4*}$, $t_{1*}$, $t_{5*}$, $t_{0*}$ computed.

The command module 64 is, in order to command the switching of a respective switch $K_1$, $K_2$, $K_3$, typically configured to send a command signal to said switch at a respective transmission time instant $t_{e1}$, $t_{e2}$, $t_{e3}$, $t_{e3b}$, $t_{e4}$, $t_{e1}$, $t_{e5}$, $t_{e0}$, each transmission time instant being equal to the subsequent switching time instant minus a switching time period $t_{o2}$, $t_{c3}$, $t_{c3b}$, $t_{o4}$, $t_{c1}$, $t_{c5}$, $t_{o0}$ specific to said switch, the switching time period being a time period necessary for the switch to perform said switching from the moment it has received the corresponding command signal from the command module 64. This switching time period typically includes a propagation time period for propagating the command through to the transistor, for example that includes the time periods associated with the crossing of a galvanic isolation barrier and/or a transistor driver that serves to drive the transistor with an adequate level of current/voltage. In the examples of FIGS. 6 to 14, each transmission time instant $t_{e1}$, $t_{e2}$, $t_{e3}$, $t_{e3b}$, $t_{e4}$, $t_{e1}$, $t_{e5}$, $t_{e0}$, is then equal to a respective time period D as from the corresponding characteristic event, that is to say, to the respective time period D added to the time instant of detection of said characteristic event. The respective time period D varies from one example to another, and is specified in each of FIGS. 6 to 14.

According to this optional add-on, an opening-switching time period $t_o$ and a closing-switching time period $t_c$ are preferably defined for each switch $K_1$, $K_2$, $K_3$.

Figure 10:
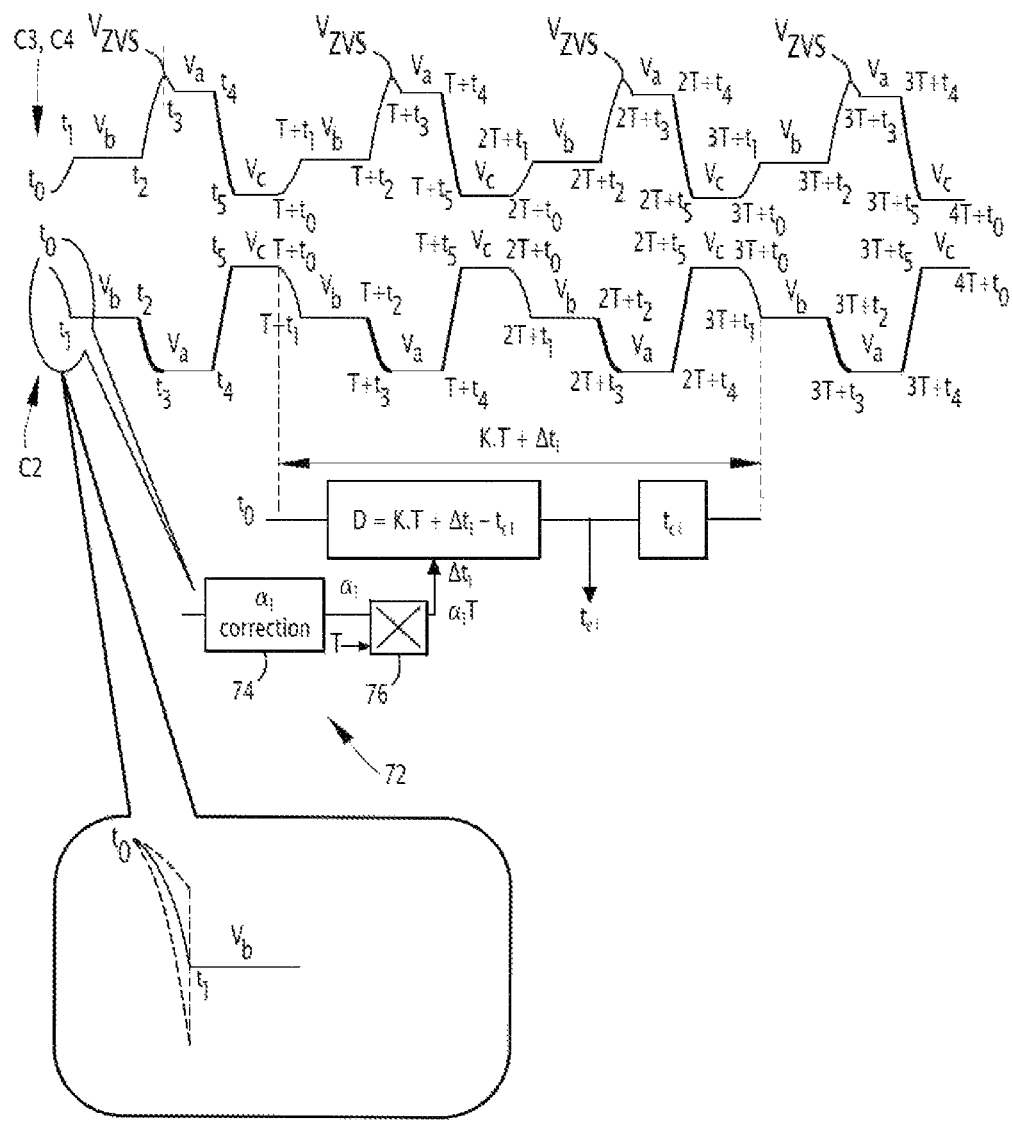
FIG. 10 is a view analogous to that of FIG. 9, according to a variant embodiment for the computation of the fourth subsequent switching time instant.
Figure 12:
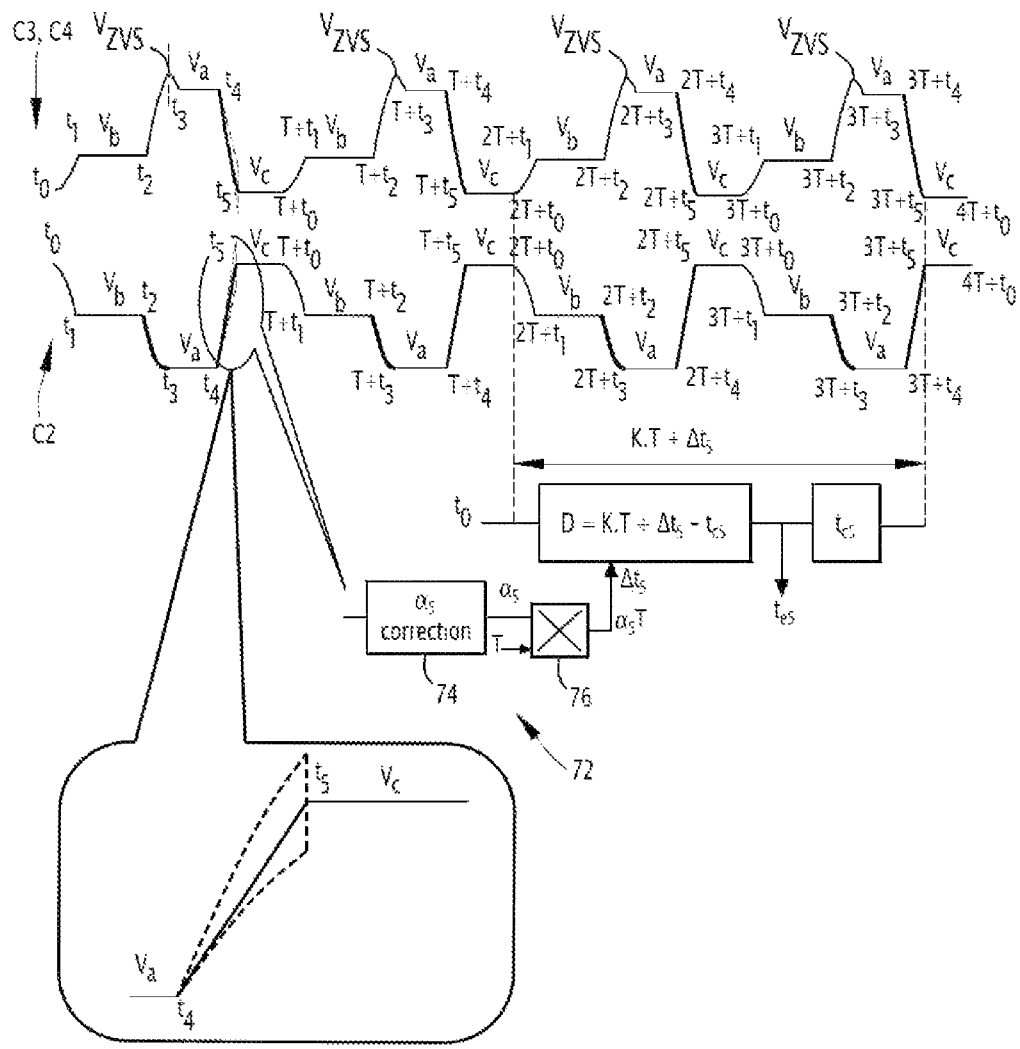
FIG. 12 is a view analogous to that of FIG. 11, according to a variant embodiment for the computation of the fifth subsequent switching time instant.

According to this optional add-on, in the example of FIG. 6, the command module 44 is thus then configured to send the command signal to the first switch $K_1$ at a first transmission time instant $t_{e2}$ equal to the first subsequent switching time instant $t_{2*}$ minus the opening-switching time period $t_{o2}$ specific to the first switch $K_1$. In an analogous manner, in the example of FIG. 7, the command module 44 is configured to send the closing command signal to the second switch $K_2$ at a second transmission time instant $t_{e3}$, $t_{e3b}$ equal to the second subsequent switching time instant $t_{3*}$, $t_{3b*}$ minus the closing-switching time period $t_{c3}$ specific to the second switch $K_2$. In the example of FIG. 8, the command module 44 is configured to send the opening command signal to the second switch $K_2$ at a third transmission time instant $t_{e4}$ equal to the third subsequent time instant $t_{4*}$ minus the opening-switching time period $t_{o4}$ specific to the second switch $K_2$. In the example of FIGS. 9 and 10, the command module 44 is configured to send the closing command signal to the first switch $K_1$ at a fourth transmission time instant $t_{e1}$ equal to the fourth subsequent time instant $t_{1*}$ minus the closing-switching time period $t_{c1}$ specific to the first switch $K_1$. In the example of FIGS. 11 and 12, the command module 44 is configured to send the closing command signal to the third switch $K_3$ at a fifth transmission time instant $t_{e5}$ equal to the fifth subsequent time instant $t_{5*}$ minus the closing-switching time period $t_{c5}$ specific to the third switch $K_3$. Again analogously, in the example of FIGS. 13 and 14, the command module 44 is configured to send the opening command signal to the third switch $K_3$ at a sixth time instant $t_{e0}$ equal to the sixth subsequent time instant $t_{0*}$ minus the opening-switching time period $t_{o0}$ specific to the third switch $K_3$.

As an optional add-on, each respective reference time period $\Delta t_2$, $\Delta t_4$, $\Delta t_1$, $\Delta t_5$ may also be modified via a second regulation loop 72 as a function of a difference between the quantity observed, such as the voltage $V_p$ across the terminals of the piezoelectric element 15, and the corresponding predefined value upon the detection of one or more event(s) during a previous resonance cycle. Each second regulation loop 72 comprises for example a computation block 74 for computing a corrective coefficient, followed by a multiplier block 76. The computation block 74 is thus then configured to compute a respective corrective coefficient $\alpha_2$, $\alpha_4$, $\alpha_1$, $\alpha_2$, $\alpha_5$, and to output this corrective coefficient $\alpha_2$, $\alpha_4$, $\alpha_1$, $\alpha_2$, $\alpha_5$, at the input of the multiplier block 76. The multiplier block 76 is then capable of multiplying this corrective coefficient $\alpha_2$, $\alpha_4$, $\alpha_1$, $\alpha_2$, $\alpha_5$, with the value of the period T of the resonance cycle, such that it outputs at the output a time period equal to the product of the corrective coefficient $\alpha_2$, $\alpha_4$, $\alpha_1$, $\alpha_2$, $\alpha_5$, and the period T of the resonance cycle, so as to modify the respective reference time period.

As a further optional add-on, the second regulation loop 72 is furthermore configured to implement a measurement of the envelope of the observed quantity, represented in the form of dashed lines in the examples of FIGS. 6, 10 and 12, and making it possible to offer even better regulation robustness.

In the example of FIG. 12, the measurement of envelope is similar to that described above with regard to FIG. 11.

In the example of FIG. 6, the dashed lines between the switching time instants $t_2$ and $t_3$ represent the typical evolving changes in the voltage $V_p$ if the opening at the first switching time instant $t_2$ occurs too early or too late, and thus provide an idea of what is to be observed: over/under voltage as compared to the predefined value $V_a$, positive or negative derivative on application of the predefined value $V_a$. In the case where the first switching time instant $t_2$ arrives too early, then the voltage $V_p$ is lower than the predefined value $V_a$ at the following switching time instant $t_3$; and conversely if the first switching time instant $t_2$ arrives too late, then the voltage $V_p$ is greater than the predefined value $V_a$ at the following switching time instant $t_3$. This can be detected via the measurement either of the envelope of the voltage $V_p$ or of a peak value of the voltage $V_p$, which is easier to implement than an instantaneous measurement of the voltage $V_p$ at the time instant $t_3$.

Similarly, in the examples of FIGS. 9 and 10, the dashed lines between the switching time instants $t_0$ and $t_1$ represent the typical evolving changes in the voltage $V_p$ if the opening at the switching time instant $t_0$ occurs too early or too late, and thus provide an idea of what is to be observed: over/under voltage as compared to the predefined value $V_b$, positive or negative derivative on application of the predefined value $V_b$. In the case where the switching time instant $t_0$ arrives too early, then the voltage $V_p$ is lower than the predefined value $V_b$ at the following switching time instant $t_1$; and conversely if the switching time instant $t_0$ arrives too late, then the voltage $V_p$ is greater than the predefined value $V_b$ at the following switching time instant $t_1$. This can be detected via the measurement either of the envelope of the voltage $V_p$ or of a peak value of the voltage $V_p$, which is easier to implement than an instantaneous measurement of the voltage $V_p$ at the time instant $t_1$.

In the example of FIG. 6, the second regulation loop 72 is implemented as a function of a difference between the voltage $V_p$ across the terminals of the piezoelectric element 15 and the corresponding predefined value, namely the value $V_a$ for the second configuration $C_2$, and the value $V_{ZVS}$ for the third and fourth configurations $C_3$, $C_4$, upon the detection of one or more event(s) during a previous resonance cycle. In the example of FIG. 6, the computation block 74 is thus then capable of computing a corrective coefficient $\alpha_2$, and the multiplier block 76 is then capable of multiplying this corrective coefficient $\alpha_2$ with the period T of the resonance cycle, such that it outputs at the output the first modified time period $\alpha_2 \cdot T$, thereby providing the means to update the first reference time period $\Delta t_2$.

Figure 8:
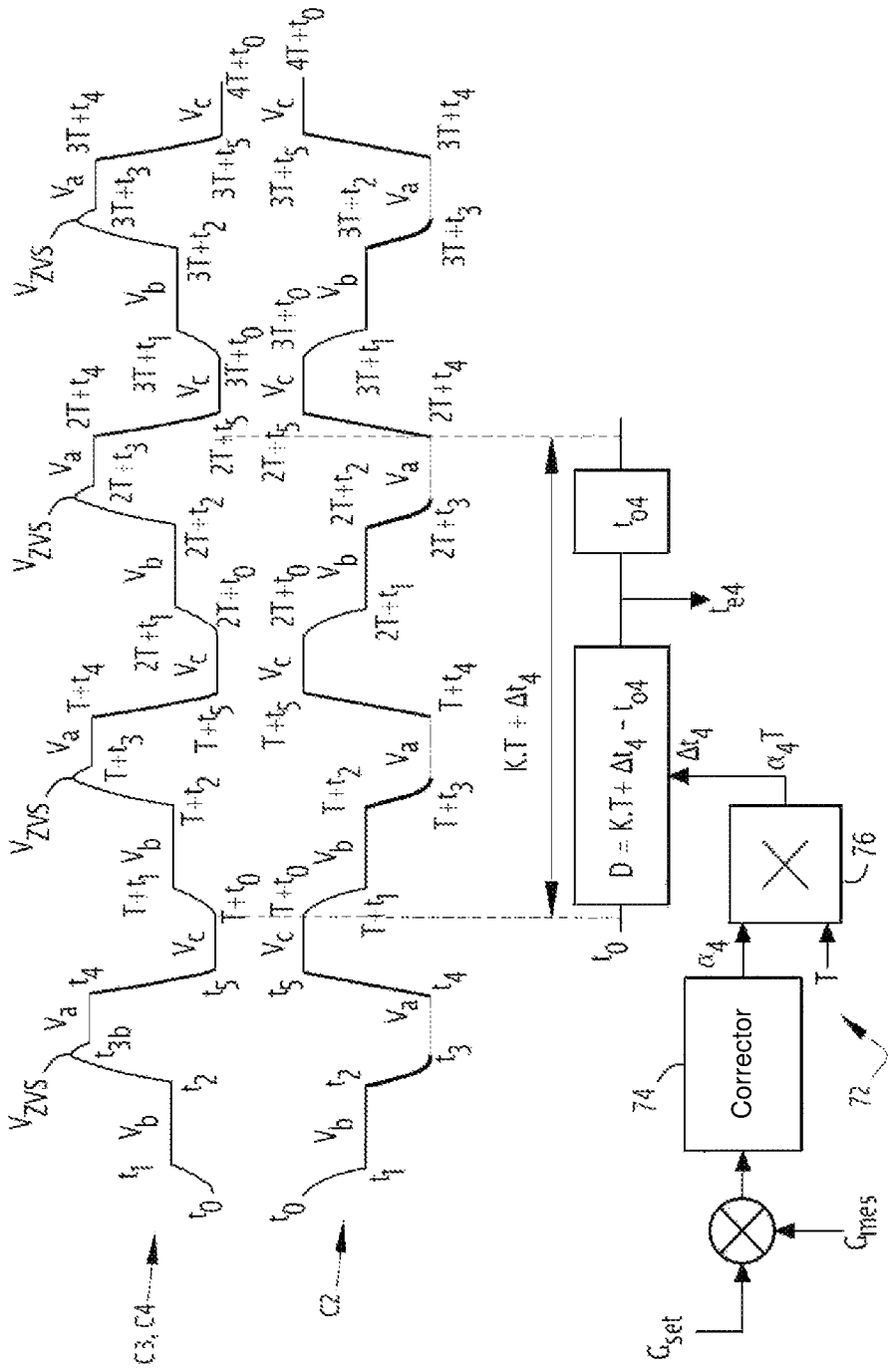
FIG. 8 is a view analogous to that of FIGS. 6 and 7, illustrating the computation of a third subsequent switching time instant corresponding to the opening of the second switch of the electrical energy converter.

In the example of FIG. 8, the second regulation loop 72 is implemented as a function of a difference between a set point quantity $G_{set}$, such as a set point output power, a set point output current, or even a set point output voltage, and a corresponding measured quantity $G_{mes}$; with the computation block 74 then being capable of calculating a corrective coefficient $\alpha_4$ as a function of the set point quantity $G_{set}$ and the corresponding measured quantity $G_{mes}$; then the multiplier block 76 is capable of multiplying said corrective coefficient $\alpha_4$ with the period T of the resonance cycle, such that it outputs at the output a modified time period $\alpha_4 \cdot T$, so as to update the respective third reference time period $\Delta t_4$.

The skilled person will moreover observe that the third switching time instant $t_4$, as well as the subsequent time instants $t_{4*}$, make it possible to modify the energy balance of the converter 10 over a given period by assuming the values $V_a$, $V_b$, and $V_c$ to be fixed. If the energy balance is positive, then the amplitude of the current $I_L$ flowing through the piezoelectric element 15 increases, and conversely if the energy balance is negative, then the amplitude of the current $I_L$ decreases. The higher [the level of] the current $I_L$ in the piezoelectric element 15, the greater the increase in the current exchanged during the phases at constant voltage (that is to say, the phases at the voltage $V_a$, $V_b$, or even $V_c$). The shorter the open circuit phases (that is to say, the phases at substantially constant charge), the greater the increase in converted power. The second regulation loop 72 thus then makes it possible to regulate the output voltage, the output current, or even the output power of the converter 10 to a respective set point value.

In the example of FIG. 10, the second regulation loop 72 is implemented as a function of a difference between the voltage $V_p$ across the terminals of the piezoelectric element 15 and the corresponding predefined value $V_b$ upon the detection of one or more event(s) during a previous resonance cycle. The computation block 74 is thus then capable of computing a corrective coefficient $\alpha_1$, and the multiplier block 76 is then capable of multiplying this corrective coefficient $\alpha_1$ with the period T of the resonance cycle, such that it outputs at the output a modified time period $\alpha_1 \cdot T$, so as to update the fourth reference time period $\Delta t_1$.

In the example of FIG. 12, the second regulation loop 72 is implemented as a function of a difference between the voltage $V_p$ across the terminals of the piezoelectric element 15 and the corresponding predefined value $V_c$, upon the detection of one or more event(s) during a previous resonance cycle. The computation block 74 is thus then capable of computing a corrective coefficient $\alpha_5$ as a function of this difference, and the multiplier block 76 is then capable of multiplying this corrective coefficient $\alpha_5$ with the period T of the resonance cycle, such that it outputs at the output a modified time period $\alpha_5 \cdot T$, so as to update the fifth reference time period $\Delta t_5$.

Figure 15:
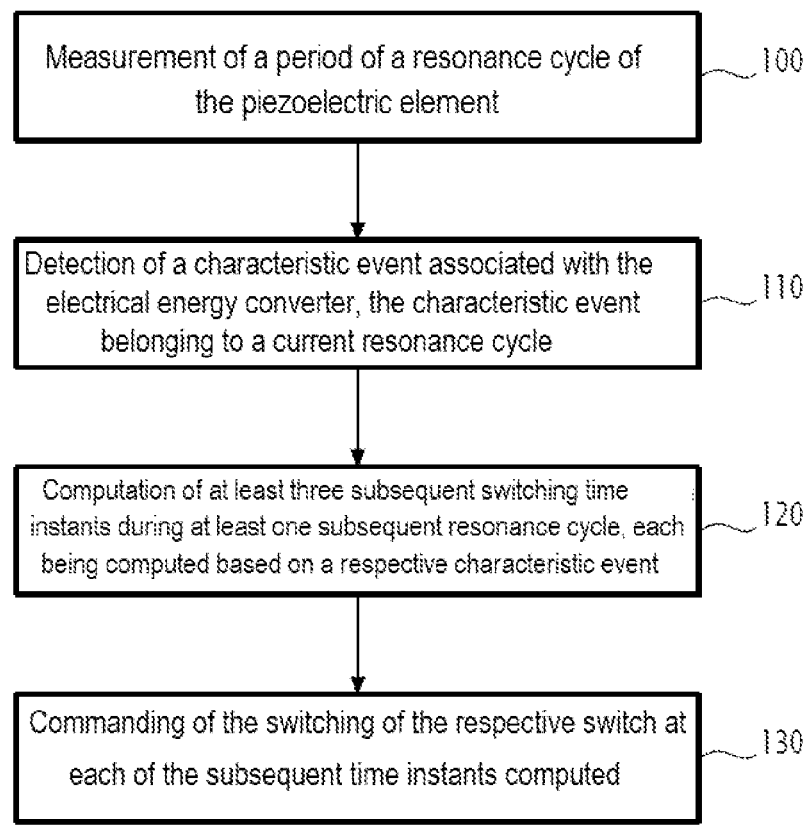
FIG. 15 is a flowchart of a control method, according to the invention, for controlling the electrical energy converter of FIG. 1, the method being implemented by the electronic control device of FIG. 1.

The operation of the electrical energy converter 10, and in particular of the electronic control device 20, according to the invention will hereafter be described with reference to FIG. 15 representing a flowchart of a control method, according to the invention, for controlling the electrical energy converter 10, the method being implemented by the electronic control device 20.

During an initial step 100, the control device 20 measures, via its measurement module 60, the period T of the cycle of resonance of the piezoelectric element 15.

During this measurement step 100, the measurement module 60 measures for example this period T of the resonance cycle by detecting two successive characteristic events of the same type, the period T of the resonance cycle then corresponding to the time period elapsed between these two successive characteristic events of the same type. The type of characteristic event for the measurement of the period T of the resonance cycle is typically a zero crossing following a predefined monotonicity of the current $I_L$ flowing through the piezoelectric element 15.

The control device 20 then proceeds to the subsequent step 110 during which it detects, via its event detection module 62, a characteristic event associated with the electrical energy converter 10, the characteristic event belonging to a current resonance cycle.

During this event detection step 110, the characteristic event detected is typically selected from the group consisting of: a zero crossing of the current $I_L$ flowing through the piezoelectric element 15; the passing of the voltage $V_p$ across the terminals of the piezoelectric element 15 to a predefined value, such as the value $V_{ref0}$; the passing of the voltage between a terminal 30, 34 of the piezoelectric element 15 and a reference potential, such as the potential of the electrical ground 48 to a predefined value; the passing of the voltage $V_p$ across the terminals of the piezoelectric element 15 to a respective substantially constant voltage value, such as the value $V_a$, $V_b$, $V_c$; the passing of the voltage between the terminal 30, 34 of the piezoelectric element and the reference potential, such as the electrical ground 48, to a respective substantially constant voltage value; and the passing of the piezoelectric element 15 to a reference deformation value, such as a deformation value measured via a separate electrode disposed against the piezoelectric element 15; and a measurement of the voltage/charges over said electrode.

At the end of this event detection step 110, the control device 20 computes, via its computation module 66 and during the subsequent step 120, at least three subsequent switching time instants during at least one subsequent resonance cycle, viz: the first subsequent time instant $t_{2*}$ corresponding to the opening of the first switch $K_1$; the second subsequent time instant $t_{3*}$, $t_{3b*}$ corresponding to the closing of the second switch $K_2$; and the third subsequent time instant $t_{4*}$ corresponding to the opening of the second switch $K_2$; each subsequent switching time instant being computed based on a respective characteristic event.

During this computation step 120, the computation module 66 optionally additionally computes the fourth subsequent time instant $t_{1*}$ corresponding to the closing of the first switch $K_1$.

As an optional add-on, when the electrical energy converter 10 comprises three switches, and thus in addition the third switch $K_3$, the computation module 66 optionally additionally computes the fifth subsequent time instant $t_{5*}$ corresponding to the closing of the third switch $K_3$, as well as the sixth subsequent time instant $t_{0*}$ corresponding to the opening of the third switch $K_3$.

During this computation step 120, the computation module 70 preferably computes the subsequent time instants $t_{2*}$, $t_{3*}$, $t_{3b*}$, $t_{4*}$, $t_{1*}$, $t_{5*}$, $t_{0*}$, during a plurality of successive subsequent resonance cycles, the subsequent time instants $t_{2*}$, $t_{3*}$, $t_{3b*}$, $t_{4*}$, $t_{1*}$, $t_{5*}$, $t_{0*}$, then being computed for each of said successive subsequent cycles.

During this computation step 120, each subsequent time instant computed $t_{2*}$, $t_{3*}$, $t_{3b*}$, $t_{4*}$, $t_{1*}$, $t_{5*}$, $t_{0*}$, typically depends on the time difference $K \cdot T$ equal to K times the period T of the resonance cycle of the piezoelectric element, K being an integer with a value greater than or equal to 1, and preferably with a value greater than 2. The value of the number K is determined as a function of the duration of the period T of the resonance cycle, and the shorter the duration of said period T of the resonance cycle, the higher the value of the number K.

In the example of FIG. 6, the first subsequent switching time instant $t_{2*}$ corresponds to the time instant $3T+t_2$, and the event detected is the zero crossing of the current $I_L$ flowing through the piezoelectric element 15 at the time instant $2T+t_0$. In this example, the value of K is then equal to 1. Furthermore, the second regulation loop 72 is implemented in relation to the second switching time instant $t_3$, that is to say, in order to regulate a measurement error around the second switching time instant $t_3$.

Figure 7:
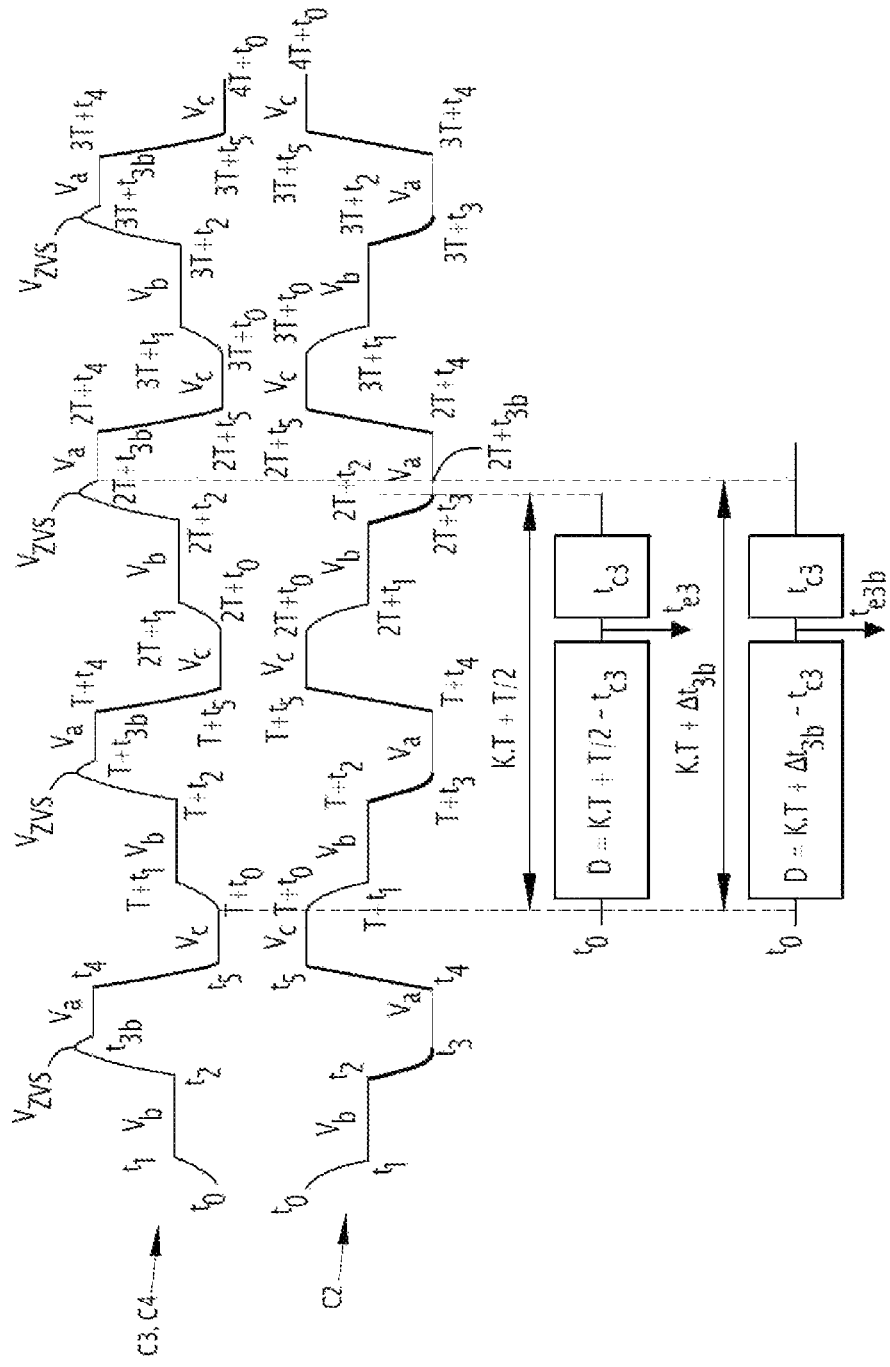
FIG. 7 is a view analogous to that of FIG. 6, illustrating the computation of a second subsequent switching time instant corresponding to the closing of a second switch of the electrical energy converter.

In the example of FIG. 7, the second subsequent switching time instant $t_{3*}$ corresponds to the time instant $2T+t_3$, and the associated event detected is the zero crossing of the current $I_L$ at the time instant $T+t_0$, this being for the second configuration C2. For the third and fourth configurations C3, C4, the second subsequent switching time instant $t_{3b*}$ corresponds to the time instant $2T+t_{3b}$, and the associated characteristic event is also the zero crossing of the current $I_L$ at the time instant $T+t_0$. In this example, the value of K is equal to 1.

In the example of FIG. 8, the third subsequent switching time instant $t_{4*}$ corresponds to the time instant $2T+t_4$, and the associated characteristic event is the zero crossing of the current $I_L$ at the time instant $T+t_0$. In this example, the value of K is equal to 1.

In the example of FIG. 9, the fourth subsequent switching time instant $t_{1*}$ corresponds to the time instant $3T+t_1$, and the associated characteristic event is the passing of the voltage $V_p$ across the terminals of the piezoelectric element 15 to the value $V_b$, at the time instant $T+t_1$. In this example, the value of K is equal to 2. In this example of FIG. 9, the first regulation loop 70 is also implemented in relation to the fourth switching time instant $t_1$.

In the example of FIG. 10, the fourth subsequent switching time instant $t_{1*}$ corresponds to the time instant $3T+t_1$, and the associated characteristic event is the zero crossing of the current $I_L$ at the time instant $T+t_0$. In this example, the value of K is equal to 2. In the example of FIG. 10, the second regulation loop 74 is implemented in relation to the fourth switching time instant $t_1$, that is to say, in order to regulate a measurement error around the fourth switching time instant $t_1$.

In the example of FIGS. 11 and 12, the fifth subsequent switching time instant $t_{5*}$ is the time instant $3T+t_5$, and the associated characteristic event is the passing of the voltage $V_p$ to the value $V_c$ at the time instant $T+t_5$ in the example of FIG. 11, the value of K being equal to 2; the associated characteristic event being the zero crossing of the current $I_L$ at the time instant $2T+t_0$ in the example of FIG. 12, the value of K thus then being equal to 1. In the example of FIG. 11, the first regulation loop 70 is implemented at the time instant $t_5$, and in the example of FIG. 12, the second regulation loop 72 is implemented at the time instant $t_5$.

Figure 14:
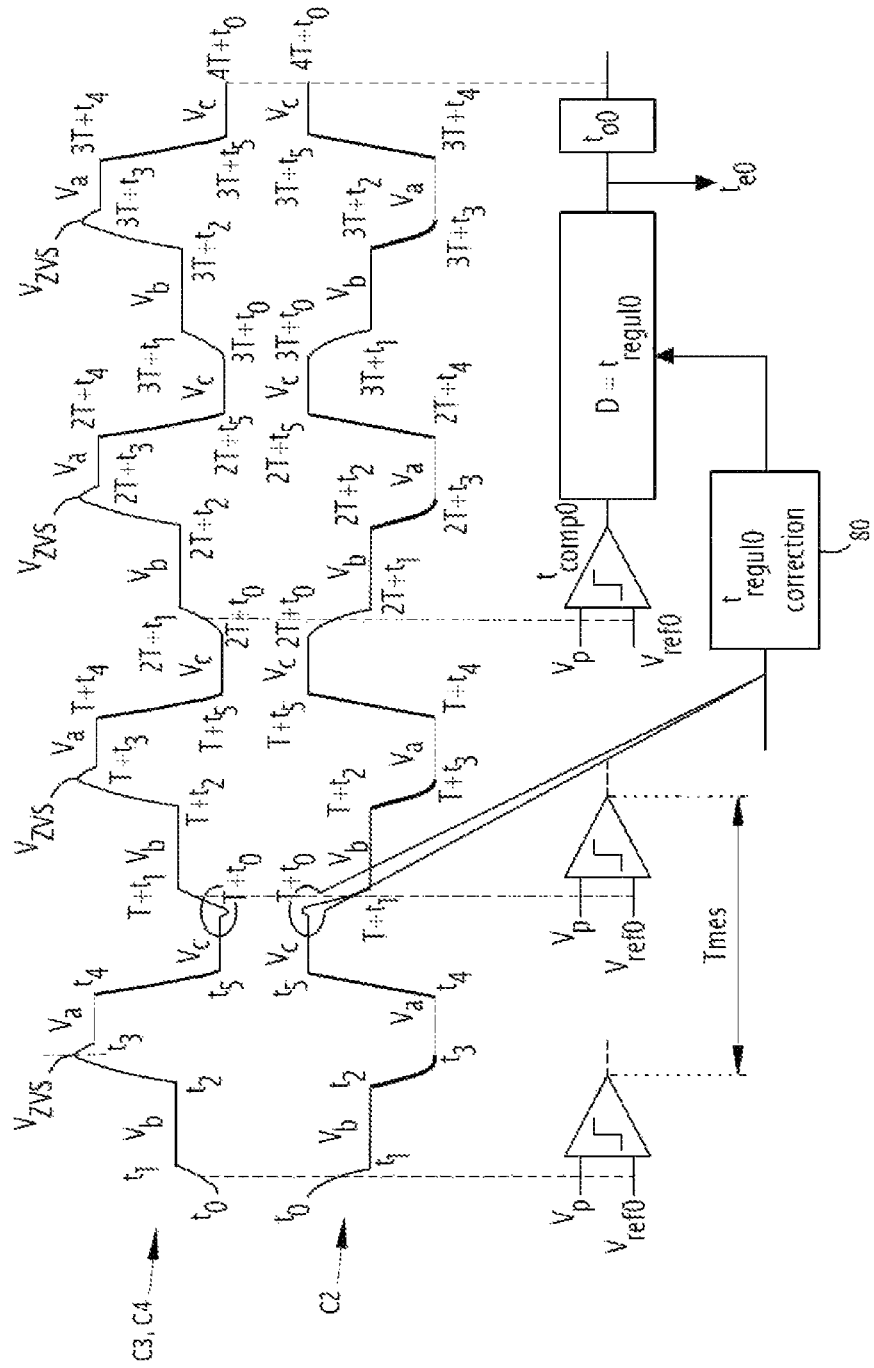
FIG. 14 is a view analogous to that of FIG. 13, according to a variant embodiment for the computation of the sixth subsequent switching time instant.

In the example of FIGS. 13 and 14, the sixth subsequent switching time instant $t_{0*}$ is the time instant $4T+t_0$, and the associated characteristic event is the zero crossing of the current $I_L$ at the time instant $2T+t_0$ in the example of FIG. 13, the value of K being equal to 2; the associated characteristic event being the passing of the voltage $V_p$ across the terminals of the piezoelectric element 15 to the reference value $V_{ref0}$ in the example of FIG. 14. In the example of FIG. 13, the first regulation loop 70 is implemented in relation to the time instant $T+t_0$, in order to regulate the comparison time period $t_{comp0}$ associated with the comparator detecting the zero crossing of the current $I_L$.

In the examples of FIGS. 6 to 13, the value of K is equal to 1 or 2, this being in particular for the sake of simplifying the drawings, and the skilled person will no doubt understand that the value of K is also equally likely to be values greater than or equal to 3, this being in order to compute even further in advance the subsequent switching time instants $t_{2*}$, $t_{3*}$, $t_{3b*}$, $t_{4*}$, $t_{1*}$, $t_{5*}$, $t_{0*}$.

In the example of FIG. 14, a third regulation loop 80 acts directly on the time period $t_{regul0}$ corresponding to the time period between, on the one hand, the result of the comparison of the voltage $V_p$ with the reference voltage $V_{ref0}$, and on the other hand, the opening command for opening the third switch $K_3$. The third regulation loop 80 is for example capable of regulating the value of the voltage overshoot which follows the opening of the third switch $K_3$ at the output of the phase at substantially constant voltage, to the value $V_c$. The third regulation loop 80 is thus then capable of regulating the time period $t_{regul0}$ so as to obtain the desired value of overshoot over the voltage $V_p$, it being necessary for this overshoot value to be neither too high to limit the losses, nor too low to be measurable without too much noise, this overshoot value being for example between 100 mV and the voltage $V_{max}$ divided by 10.

In the example of FIG. 14, the reference voltage $V_{ref0}$ is for example comprised between the value $V_c$ and the value $V_b$ through which the voltage $V_p$ is supposed to pass at the output of the phase at voltage substantially constant at the value $V_c$ which is implemented just prior thereto. The probability of detection of the passing of the voltage $V_p$ through the reference voltage $V_{ref0}$ is thus increased.

In addition, the time period $t_{regul0}$ is bounded between a minimum value and a maximum value which serves to enable the continued control of the converter 10, in particular during start-up where instances of detection may be missed. The difference between the maximum and minimum values associated with the time period $t_{regul0}$ is preferably limited to the period T of the resonance cycle in order to have a single detection solution, and the difference between the maximum and minimum values where a coefficient of regulation $\alpha_{regul0}$ meant to be multiplied with the period T of the resonance cycle so as to update the value of the time period $t_{regul0}$ is also less than 1.

At the end of the computation step 120, the control device 20, during the subsequent step 130 and via its command module 64, then commands: the switching of the respective first and second switches $K_1$, $K_2$, at each of the first, second, and third subsequent time instants $t_{2*}$, $t_{3*}$, $t_{3b*}$, $t_{4*}$ computed; and indeed also the closing of the first switch $K_1$ in the fourth subsequent time instant $t_{1*}$ computed.

As an optional add-on, when the electrical energy converter 10 comprises three switches, and thus in addition the third switch $K_3$, the command module 64 then commands the switching of the third switch $K_3$ at each of the fifth and sixth subsequent time instants $t_{5*}$, $t_{0*}$ computed.

During the command step 130, the command signals for the respective switches $K_1$, $K_2$, $K_3$, are preferably sent, by the command module 64, at the respective transmission time instants $t_{e2}$, $t_{e3}$, $t_{e3b}$, $t_{e4}$, $t_{e1}$, $t_{e5}$, $t_{e0}$, preceding the respective computed subsequent time instant $t_{2*}$, $t_{3*}$, $t_{3b*}$, $t_{4*}$, $t_{1*}$, $t_{5*}$, $t_{0*}$, of the switching time period specific to said respective switch, this being so in order for the effective switching of the respective switch to be better synchronised with the respective computed subsequent time instant $t_{2*}$, $t_{3*}$, $t_{3b*}$, $t_{4*}$, $t_{1*}$, $t_{5*}$, $t_{0*}$, the switching time period of the respective switch being the time period necessary for the switch to perform said switching from the moment it has received the corresponding command signal from the command module 64, this switching time period typically including the propagation time periods for propagating the command through a communication bus, and/or a galvanic isolation interface, and/or a transistor driver, and/or logic gates, and/or protection devices.

In addition, each of the computed/corrected time periods T, $\Delta T_i$, $\alpha_i T$, $t_{compi}$, $t_{reguli}$, with i comprised between 0 and 6, are able to be bounded so as to ensure the control, indeed even non-optimal control, of the respective switches $K_1$, $K_2$, $K_3$, in the event that certain instances of detection/measurements exhibit errors. Such errors may for example be present during the start-up of the converter 10, when the voltages and/or currents are not yet well established.

A certain number of examples of embodiments and topologies of the converter 10 have been presented with reference to FIGS. 1 to 5, with this being for different conversion configurations, namely step-down/buck, step-up/boost, ultra-low step-down/buck, and variant step-down/buck. The skilled person will nevertheless understand that the invention is not limited to these topologies, and that the invention also relates in particular to the topologies described in the documents FR 3 064 850 B1, FR 3 086 471 A1 and FR 3 086 472 A1, in particular those described with reference to FIG. 19 or FIG. 20 of the document FR 3 086 472 A1. These different topologies then make it possible to select the predefined values $V_a$, $V_b$, and $V_c$ from among the voltages: 0; $V_{in}$; $-V_{in}$; $V_{out}$; $-V_{out}$; $V_{in}-V_{out}$; $V_{out}-V_{in}$; $V_{in}+V_{out}$; and $-V_{in}-V_{out}$.

In addition, the skilled person will also understand that the invention is not limited to the three voltage levels at the predefined values $V_a$, $V_b$, and $V_c$, and that the invention relates in particular also to an operation of the converter 10 with an additional voltage level, as described for example with regard to FIGS. 17 and 18 in the document FR 3 086 472 A1.

Thus, with the electronic control device 20 according to the invention, the subsequent switching time instants $t_{2*}$, $t_{3*}$, $t_{3b*}$, $t_{4*}$, $t_{1*}$, or indeed even as an optional add-on $t_{5*}$, $t_{0*}$, for switching of the switches $K_1$, $K_2$, or even $K_3$, are then computed in advance for one or more subsequent resonance cycles, that are posterior to the current resonance cycle comprising the one or more associated characteristic event (s) based on which these subsequent switching time instants $t_{2*}$, $t_{3*}$, $t_{3b*}$, $t_{4*}$, $t_{1*}$, $t_{5*}$, $t_{0*}$ are computed.

The control device 20 according to the invention thus provides the means to ensure the appropriate operation of the converter 10 with switching of the switches $K_1$, $K_2$, $K_3$, at the appropriate time instants, and this being so even for a high operating frequency of the converter 10, such as a frequency greater than 1 MHz. The operating frequency of the converter 10 is equal to the inverse of the period T of the resonance cycle.

It is thus seen that the electronic control device 20 and the control method according to the invention make it possible to offer enhanced control of the electrical energy converter 10, in particular where said converter operates at a high operating frequency, typically above 1 MHz.

The invention claimed is:

1. An electronic control device for controlling an electrical energy converter, the converter comprising a piezoelectric element and a plurality of switches that are capable of being commanded to alternate phases at substantially constant voltage across the terminals of the piezoelectric element, and phases at substantially constant charge across the terminals of said piezoelectric element, the electronic control device comprising:
 a measurement module configured to measure a period of a resonance cycle of the piezoelectric element;
 an event detection module configured to detect at least one characteristic event associated with the electrical energy converter, the at least one characteristic event belonging to a current resonance cycle;
 a command module configured to command switching of each of the switches;

a computation module configured to compute at least three subsequent switching time instants during at least one subsequent resonance cycle, each subsequent resonance cycle being posterior to the current resonance cycle, each subsequent switching time instant being computed based on a respective characteristic event, a first subsequent time instant corresponding to the opening of a first switch, a second subsequent time instant corresponding to the closing of a second switch, and a third subsequent time instant corresponding to the opening of the second switch; and the command module being configured to command switching of a respective switch at each of the computed subsequent time instants.

2. The device according to claim 1, wherein a total number of phases at substantially constant voltage across the terminals of the piezoelectric element and at substantially constant charge across the terminals of said piezoelectric element during a respective resonance cycle is greater than or equal to 6.

3. The device according to claim 1, wherein each characteristic event is selected from the group consisting of: a zero crossing of the current flowing through the piezoelectric element; the passing of the voltage across the terminals of the piezoelectric element to a predefined value; the passing of the voltage between a terminal of the piezoelectric element and a reference potential to a predefined value; the passing of the voltage across the terminals of the piezoelectric element to a respective substantially constant voltage value; the passing of the voltage between the terminal of the piezoelectric element and the reference potential to a respective substantially constant voltage value; and the passing to a reference deformation value, such as a deformation value measured via a separate electrode disposed against the piezoelectric element.

4. The device according to claim 3, wherein the characteristic event associated with the first, second, and third subsequent time instants is the zero crossing of the current flowing through the piezoelectric element.

5. The device according to claim 4, wherein the characteristic event is the zero crossing and decreasing values of said current.

6. The device according to claim 1, wherein each subsequent time instant computed depends on a time difference equal to K times the period of the resonance cycle of the piezoelectric element, K being an integer with a value greater than or equal to 1.

7. The device according to claim 6, wherein the value of the number K is determined as a function of the duration of the period of the resonance cycle, and the shorter the duration of said period, the higher the value of the number K.

8. The device according to claim 6, wherein the value of the number K is greater than 2.

9. The device according to claim 6, wherein each of the first, second, and third subsequent time instants is equal, starting from the characteristic event, to a sum of the time difference and a respective reference time period.

10. The device according to claim 9, wherein each respective reference time period is determined based on the corresponding switching time instant during the current resonance cycle, or based on the period of the resonance cycle.

11. The device according to claim 1, wherein the command module is, in order to command the switching of a respective switch, configured to send a command signal to said switch at a respective transmission time instant, each transmission time instant being equal to the respective subsequent switching time instant minus a switching time period specific to said switch, the switching time period being a time period necessary for the switch to perform said switching from the moment it has received the corresponding command signal.

12. The device according to claim 11, wherein the switching time period includes a propagation time period for propagating the corresponding command signal through a communication bus, and/or a galvanic isolation interface, and/or a transistor driver, and/or logic gates, and/or protection devices.

13. The device according to claim 11, wherein a respective opening-switching time period and a respective closing-switching time period are predefined for each switch.

14. The device according to claim 1, wherein the computation module is configured to compute the subsequent time instants during a plurality of successive subsequent resonance cycles, the at least three subsequent time instants being computed for each of said successive subsequent cycles.

15. The device according to claim 1, wherein the computation module is configured to further compute a fourth subsequent time instant corresponding to the closing of the first switch.

16. The device according to claim 15, wherein the characteristic event associated with the fourth subsequent time instant is the passing of the voltage across the terminals of the piezoelectric element to a respective substantially constant voltage value, or else the zero crossing of the current flowing through the piezoelectric element.

17. The device according to claim 1, wherein the converter comprises three switches adapted to being commanded to alternate phases at substantially constant voltage across the terminals of the piezoelectric element, and phases at substantially constant charge across the terminals of said piezoelectric element; and wherein the computation module is configured to further compute a fifth subsequent time instant corresponding to the closing of a third switch.

18. The device according to claim 17, wherein the characteristic event associated with the fifth subsequent time instant is the passing of the voltage across the terminals of the piezoelectric element to a respective substantially constant voltage value, or else the zero crossing of the current flowing through the piezoelectric element.

19. The device according to claim 17, wherein the computation module is configured to further compute a sixth subsequent time instant corresponding to the opening of the third switch.

20. The device according to claim 19, wherein the characteristic event associated with the sixth subsequent time instant is the zero crossing of the current flowing through the piezoelectric element, or else the passing of the voltage across the terminals of the piezoelectric element to a predefined value.

21. The device according to claim 1, wherein the measurement module is configured to measure the period of the resonance cycle by detecting two successive characteristic events of the same type, the period of the resonance cycle corresponds to the time period elapsed between these two successive characteristic events.

22. The device according to claim 21, wherein said type of characteristic event is a zero crossing following a predefined monotonicity of a current flowing through the piezoelectric element.

23. An electronic energy conversion system for converting electrical energy, comprising:
- the electrical energy converter comprising the piezoelectric element and the plurality of switches adapted to being commanded to alternate phases at substantially constant voltage across the terminals of the piezoelectric element and phases at substantially constant charge across the terminals of said piezoelectric element; and
- the electronic control device for controlling the electrical energy converter, the control device being according to claim 1.

24. The system according to claim 23, wherein the electronic energy conversion system is a direct energy conversion system, such as a direct current-direct current conversion system, or an alternating current-direct current conversion system.

25. A control method for controlling an electrical energy converter, the converter comprising a piezoelectric element and a plurality of switches adapted to being commanded to alternate phases at substantially constant voltage across the terminals of the piezoelectric element, and phases at substantially constant charge across the terminals of said piezoelectric element, the method being implemented by an electronic control device and comprising:
- measurement of a period of a resonance cycle of the piezoelectric element;
- detection of a characteristic event associated with the electrical energy converter, the characteristic event belonging to a current resonance cycle; and
- computation of at least three subsequent switching time instants during at least one subsequent resonance cycle, each subsequent resonance cycle being posterior to the current resonance cycle, each subsequent switching time instant being computed based on a respective characteristic event, a first subsequent time instant corresponding to the opening of a first switch, a second subsequent time instant corresponding to the closing of a second switch and a third subsequent time instant corresponding to the opening of the second switch;
- commanding of switching of each of the switches; said commanding comprising a command for the switching of the respective switch at each of the subsequent time instants computed.

* * * * *